(12) United States Patent
Pupovac et al.

(10) Patent No.: US 11,034,094 B2
(45) Date of Patent: Jun. 15, 2021

(54) WELDING MACHINE FOR CONTROLLING DIRECTION AND MAGNITUDE OF WELD FORCE VECTOR DURING A PLASTIC WELDING OPERATION

(71) Applicant: SPM AUTOMATION (CANADA) INC., Windsor (CA)

(72) Inventors: Rade Pupovac, Tecumseh (CA); Zachary Touesnard, Windsor (CA); Christian Peter Holtkamp, Windsor (CA); Boris Novakovic, Lakeshore (CA)

(*) Notice: Subject to any disclaimer, the term of this patent is extended or adjusted under 35 U.S.C. 154(b) by 0 days.

(21) Appl. No.: 16/792,627

(22) Filed: Feb. 17, 2020

(65) Prior Publication Data

US 2020/0180230 A1    Jun. 11, 2020

Related U.S. Application Data

(62) Division of application No. 15/668,104, filed on Aug. 3, 2017, now Pat. No. 10,562,232.

(Continued)

(51) Int. Cl.
| | |
|---|---|
| B29C 65/02 | (2006.01) |
| B29C 65/00 | (2006.01) |
| B29C 65/20 | (2006.01) |
| B29C 65/14 | (2006.01) |
| B29C 65/78 | (2006.01) |
| B29C 65/56 | (2006.01) |
| B29L 31/30 | (2006.01) |
| B29L 31/00 | (2006.01) |

(52) U.S. Cl.
CPC .......... *B29C 65/02* (2013.01); *B29C 65/1432* (2013.01); *B29C 65/20* (2013.01); *B29C 65/56* (2013.01); *B29C 65/7841* (2013.01); *B29C 65/7858* (2013.01); *B29C 66/112* (2013.01); *B29C 66/116* (2013.01); *B29C 66/131* (2013.01); *B29C 66/301* (2013.01); *B29C 66/341* (2013.01); *B29C 66/54* (2013.01); *B29C 66/542* (2013.01); *B29C 66/73921* (2013.01); *B29C 66/8169* (2013.01); *B29C 66/8246* (2013.01); *B29C 66/83221* (2013.01); *B29C 66/9261* (2013.01); *B29C 66/92441* (2013.01); *B29C 66/863* (2013.01); *B29L 2031/30* (2013.01); *B29L 2031/747* (2013.01)

(58) Field of Classification Search
CPC ..... B29C 65/02; B29C 65/1432; B29C 65/20; B29C 65/56; B29C 65/7841; B29C 65/7858; B29C 66/112; B29C 66/116; B29C 66/131; B29C 66/301; B29C 66/341; B29C 66/54; B29C 66/542; B29C 66/73921; B29C 66/8169; B29C 66/8246; B29C 66/83221; B29C 66/92441; B29C 66/9261

See application file for complete search history.

(56) References Cited

U.S. PATENT DOCUMENTS

| | | | |
|---|---|---|---|
| 4,086,122 A * | 4/1978 | Bouyoucos | ......... B29C 66/8322 156/556 |
| 2005/0005859 A1 * | 1/2005 | Koshiishi | .......... H01J 37/32642 118/728 |

(Continued)

*Primary Examiner* — Daniel McNally
(74) *Attorney, Agent, or Firm* — George L. Boller

(57) ABSTRACT

A plastic welding machine for welding plastic parts together is capable of controlling the weld force vector in both magnitude and direction.

16 Claims, 19 Drawing Sheets

Related U.S. Application Data

(60) Provisional application No. 62/371,701, filed on Aug. 5, 2016.

(56) References Cited

U.S. PATENT DOCUMENTS

2007/0157886 A1* 7/2007 Elgar .................. G03F 7/70875
 118/729
2012/0318431 A1* 12/2012 Katamura ........... H01L 21/6715
 156/60

* cited by examiner

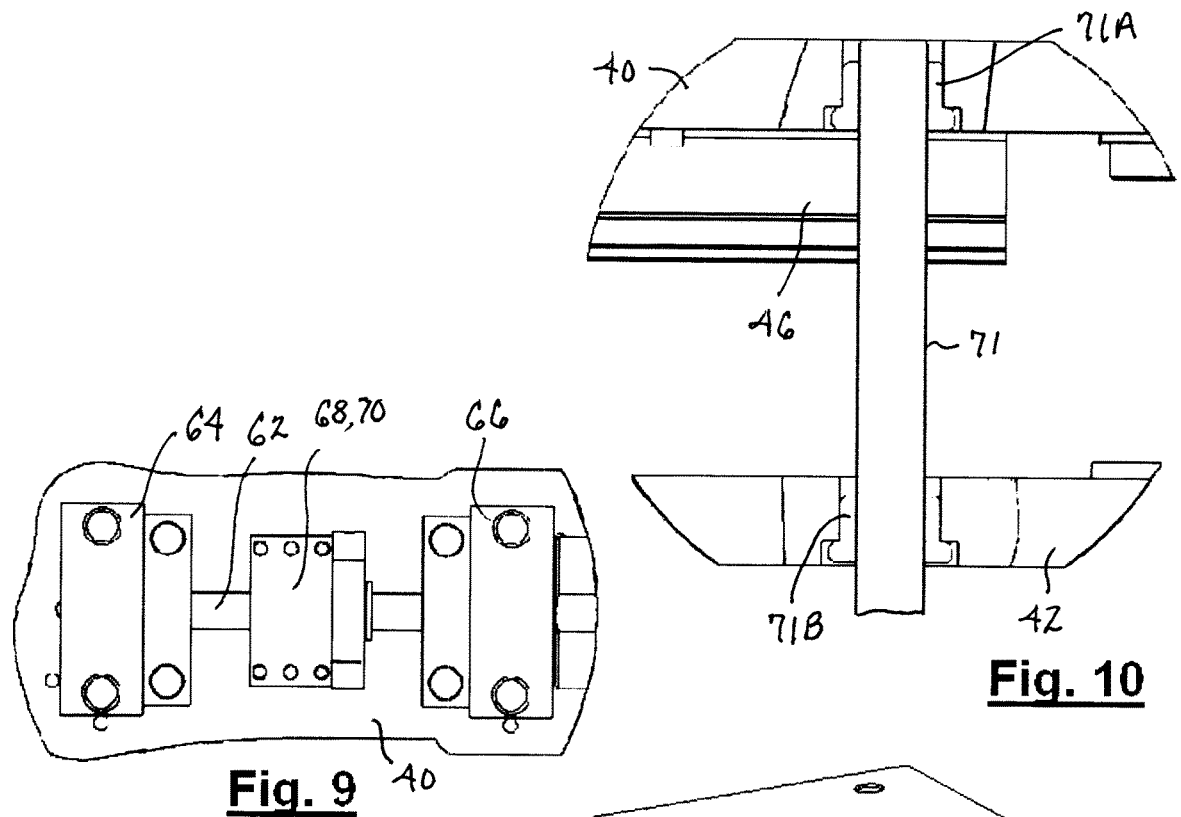
Fig. 10
Fig. 9
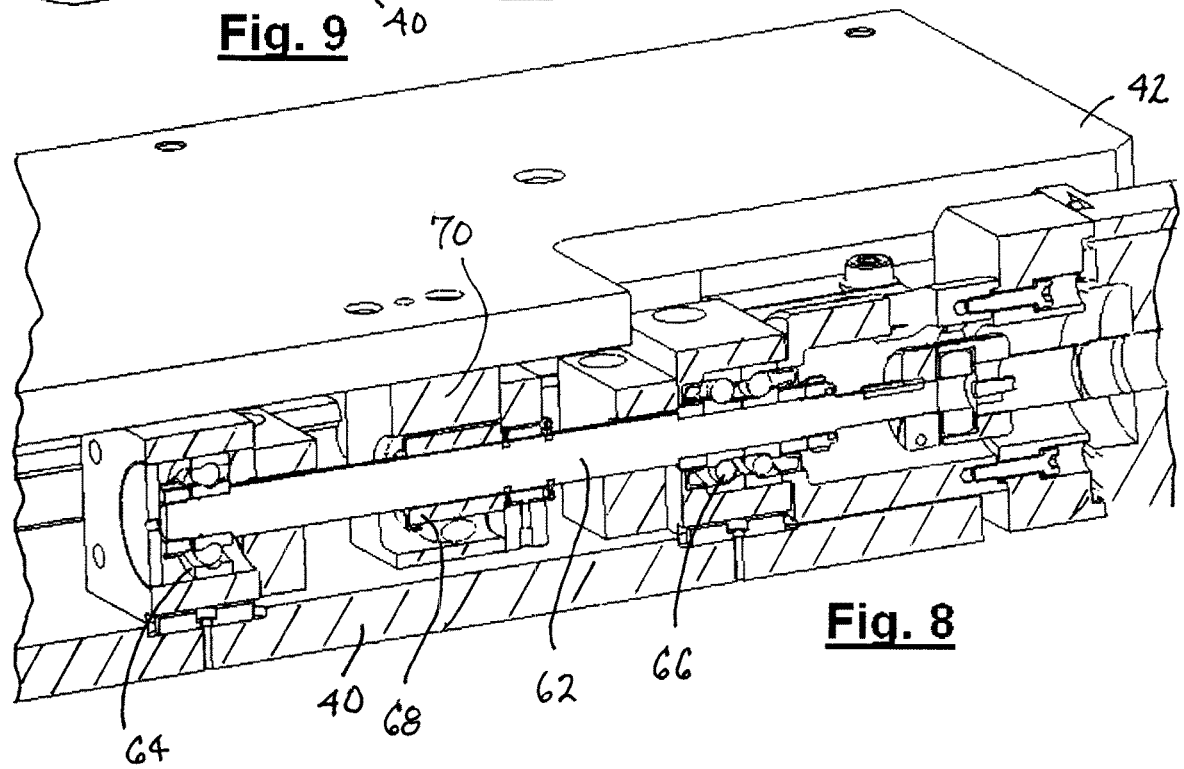
Fig. 8

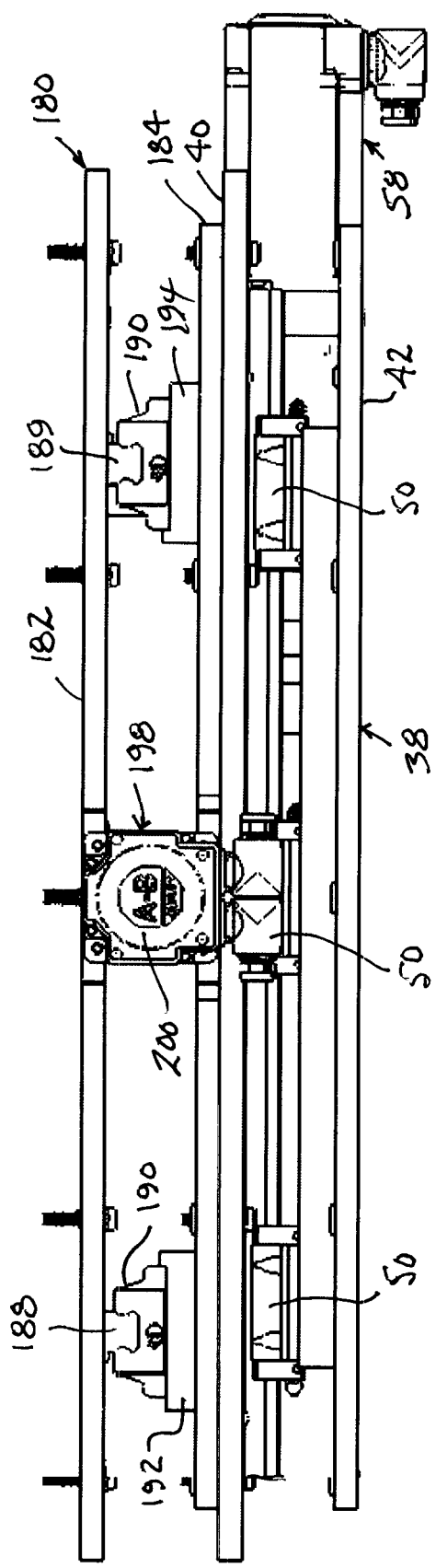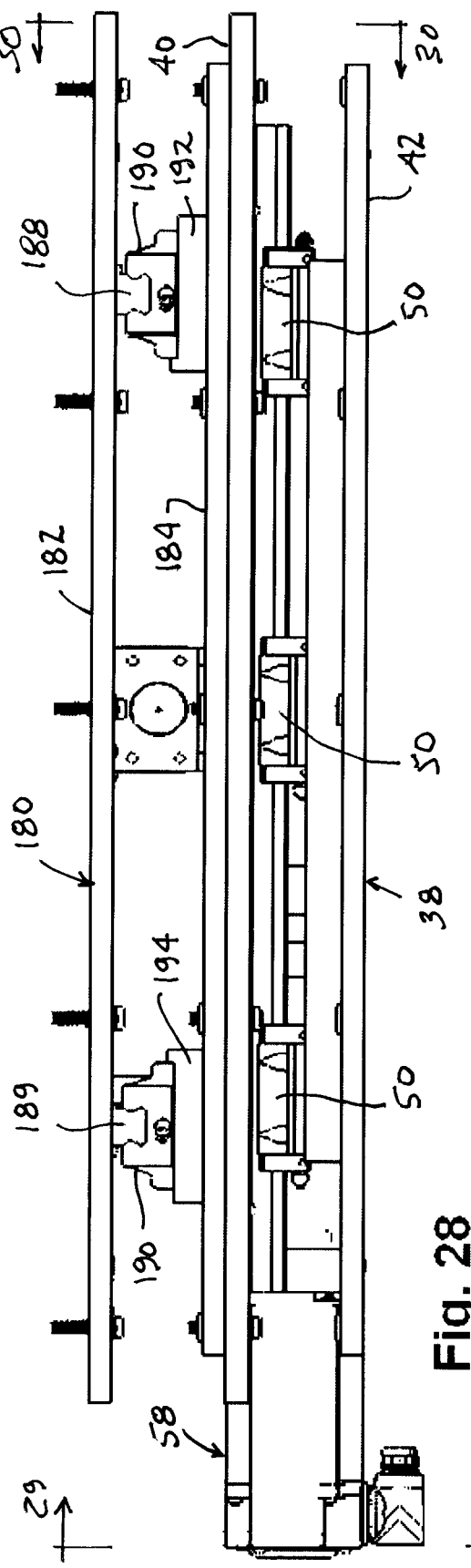
Fig. 27
Fig. 28

WELDING MACHINE FOR CONTROLLING DIRECTION AND MAGNITUDE OF WELD FORCE VECTOR DURING A PLASTIC WELDING OPERATION

REFERENCE TO RELATED APPLICATIONS AND PRIORITY CLAIMS

This application claims the priority of application Ser. No. 15/668,104, filed Aug. 3, 2017, which claims priority of Application No. 62/371,701, filed 5 Aug. 2016, the entire contents of which is incorporated herein by reference.

TECHNICAL FIELD

This disclosure relates to hot plate welding for joining one plastic part to another plastic part.

BACKGROUND

Plastic parts are commonly manufactured by a molding process, such as blow molding or injection molding, and then further processed by one or more operations such as boring, drilling, and/or welding.

Welding is a process for joining plastic parts together by melting plastic at a location in each part where a weld joint is to be created, then placing the parts together so that their melt pools merge together, and finally allowing the melt pools to solidify into the finished weld joint.

One type of plastic welding is referred to as contact welding. Contact welding comprises placing parts which are to be joined together in direct contact with a heating element, such as a hot plate, at locations on the parts where a weld joint is to be created, and then after sufficient melting of plastic, placing the parts together at the melt pools and allowing the melts to solidify.

Another type of plastic welding is non-contact welding which comprises placing a heating element a short distance from a part and using radiated heat, instead of direct contact, to melt plastic.

SUMMARY OF THE DISCLOSURE

A weld joint at which parts are to be joined has a shape which is a function of the geometries of the parts. Some parts may have shapes which allow the weld joint to lie in a two-dimensional flat plane. After melting of plastic at locations on the parts where a weld joint is to be created, the parts can be joined together by moving them together in a direction perpendicular to the two-dimensional flat plane and applying a controlled force in that same direction until the melts solidify. The direction in which the holding force is applied is called the weld force vector and the two-dimensional plane of the weld joint is called the weld plane.

Other plastic parts may have shapes which require the weld joint to be three-dimensional rather than flat. A three-dimensional weld joint can range from being relatively simple to relatively complex. An example of a relatively simple three-dimensional weld joint is one which has slight three-dimensional curvature. A relatively complex three-dimensional weld joint is one which is more extremely curved and/or irregular. An example of such a weld joint is one which joins housing parts of a housing of an exterior lamp assembly which is used in certain automotive vehicles. Such housings are styled by automotive designers to wrap around a corner of a vehicle. For example, a tail lamp assembly primarily faces rearward but also wraps around a side of a vehicle. The weld joint of such an assembly must be leak-proof, and if it is not, the assembly is scrapped.

When plastic welding is being considered for joining the housing parts of some proposed lamp assembly designs, analysis of the designs by plastic welding engineers and technicians may conclude that no weld joint geometries exist which would reliably assure manufacture of leak-proof assemblies in a mass-production operation.

The present invention provides a solution for such situations and can be applied to both contact welding and non-contact welding.

Briefly, the present invention comprises a hot plate welding machine which has two or more movements for varying direction and/or magnitude of the weld force vector when joining a first part to a second part after respective weld joint locations on both parts have been melted and the parts are placed together. One movement is that of one or both platens of a welding machine which are relatively moveable toward and away from each other along a first linear axis, which may be referred to as a z-axis. The present invention provides for moving at least one of the two plastic parts along at least one axis other than the z-axis, such as an x-axis, a y-axis, or both an x-axis and a y-axis.

One general aspect of the invention relates to a plastic welding machine for welding plastic parts together which comprises an upper platen and a lower platen which are relatively moveable on a frame toward and away from each other in a direction parallel with a z-axis.

A slide assembly comprises a base plate which is disposed against a surface of one of the upper and lower platens opposite the other of the upper and lower platens and which is fastened to the one of the upper and lower platens.

A first tooling half which is mounted on the other of the upper and lower platens comprises a fixture in which a first plastic part can be fixtured for welding.

The slide assembly comprises a tooling plate which faces the other of the upper and lower platens and which is movable relative to the base plate in a direction lying in a plane which is transverse to the z-axis.

A second tooling half is mounted on the tooling plate for movement with the tooling plate and comprises a fixture in which a second plastic part can be fixtured for welding to the first plastic part.

The slide assembly comprises a drive which is operable to move the tooling plate relative to the base plate in the direction lying in the plane which is transverse to the z-axis.

Another general aspect of the invention relates to a plastic welding machine for welding plastic parts together comprising an upper platen and a lower platen, which are relatively moveable on a frame toward and away from each other in a direction parallel with a z-axis, and a first slide assembly and a second slide assembly.

Each slide assembly comprises a base plate and a tooling plate which is movable relative to the respective base plate in a respective direction lying in a plane which is perpendicular to the z-axis.

The base plate of the first slide assembly is disposed against a surface of one of the upper and lower platens opposite the other of the upper and lower platens and is fastened to the one of the upper and lower platens, and the base plate of the second slide assembly is disposed against and fastened to the tooling plate of the first slide assembly.

A first tooling half is mounted on the other of the upper and lower platens and comprises a fixture in which a first plastic part can be fixtured for welding.

A second tooling half is mounted on the tooling plate of the second slide assembly for movement with the tooling plate of the second slide assembly relative to the base plate of the second slide assembly.

The second tooling half comprises a fixture in which a second plastic part can be fixtured for welding to the first plastic part.

The first slide assembly comprises a first drive which is operable to move the tooling plate of the first slide assembly relative to the base plate of the first slide assembly in a first direction which is perpendicular to the z-axis, and the second slide assembly comprises a second drive which is operable to move the tooling plate of the second slide assembly relative to the base plate of the second slide assembly in a second direction which is perpendicular to both the z-axis and the first direction. Another general aspect of the invention relates to the methods performed by the plastic welding machine, as claimed in application Ser. No. 15/668,104, now U.S. Pat. No. 10,562,232.

BRIEF DESCRIPTION OF THE DRAWINGS

FIG. 8 is an enlarged view, partly in cross section, of a portion of FIG. 6 as viewed from a different direction.

FIG. 9 is an enlarged top plan view of a portion of FIG. 6.

FIG. 10 is an enlarged view in circle 10 of FIG. 3.

FIG. 27 is an enlarged rear elevation view in the direction of arrow 27 in FIG. 26.

FIG. 28 is an enlarged front elevation view in the direction of arrow 28 in FIG. 26.

DETAILED DESCRIPTION

Figure 1:
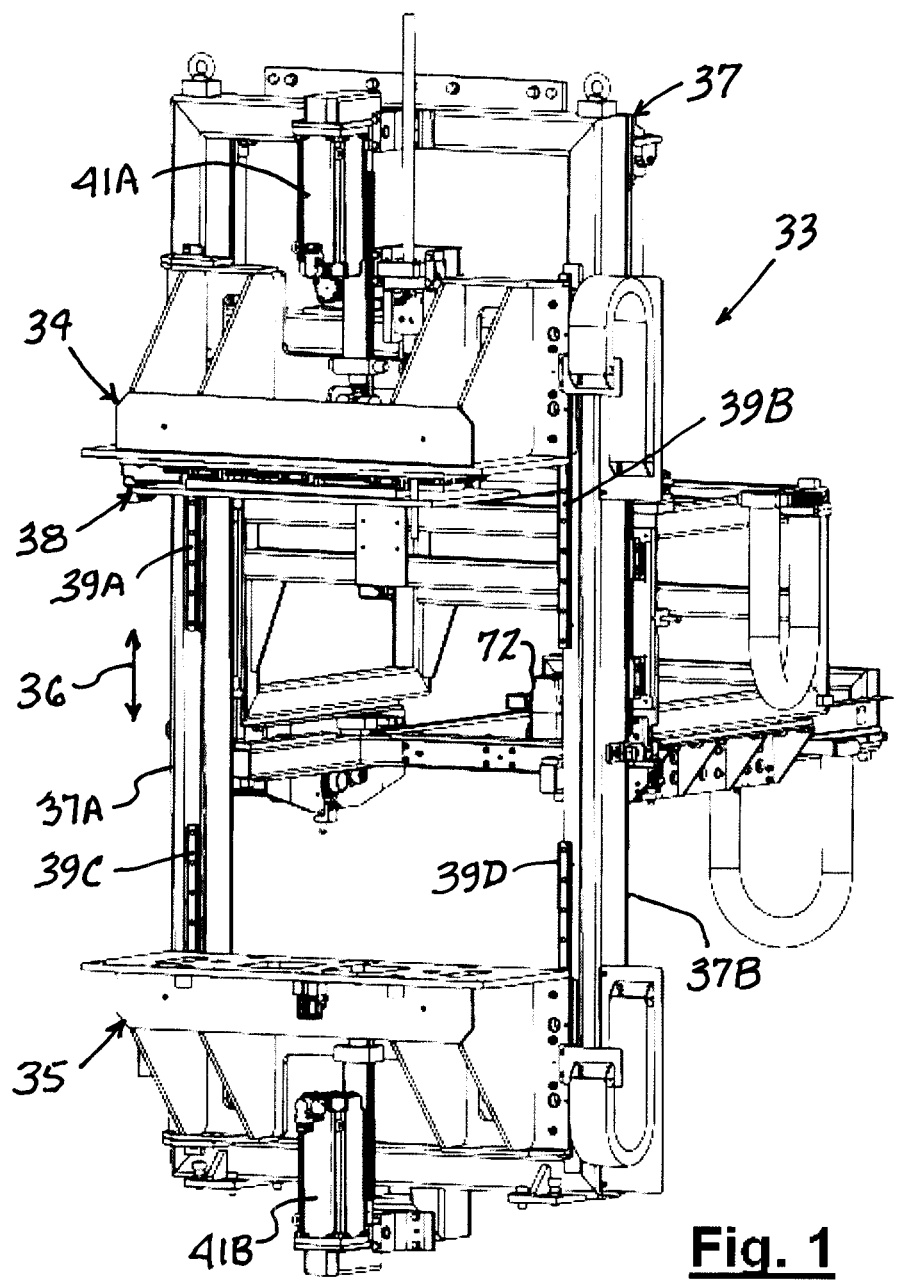
FIG. 1 is a perspective view of a portion of a plastic welding machine.
Figure 2:
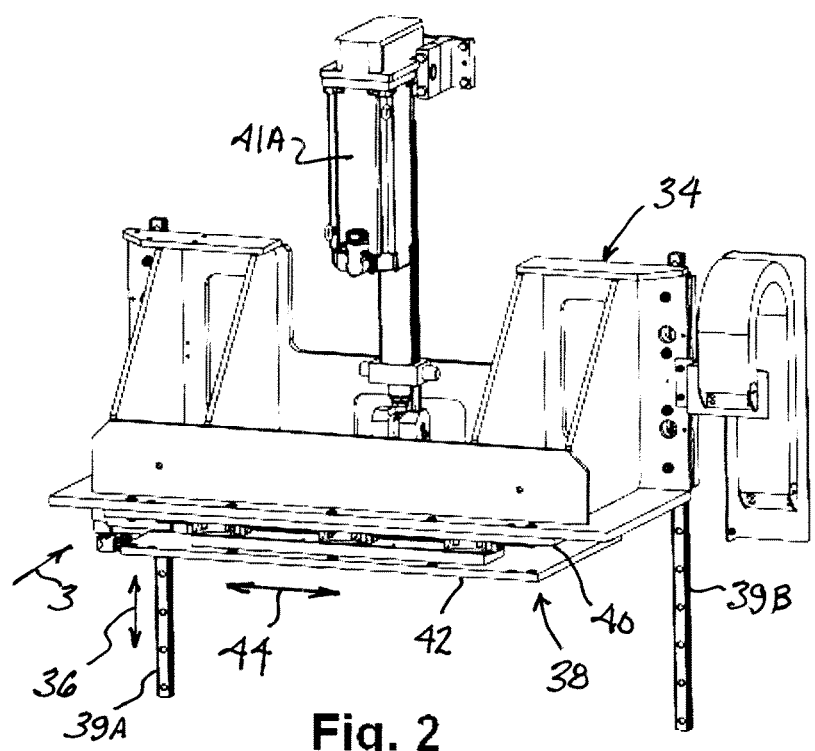
FIG. 2 is a perspective view of a portion of FIG. 1 on a larger scale.
Figure 3:
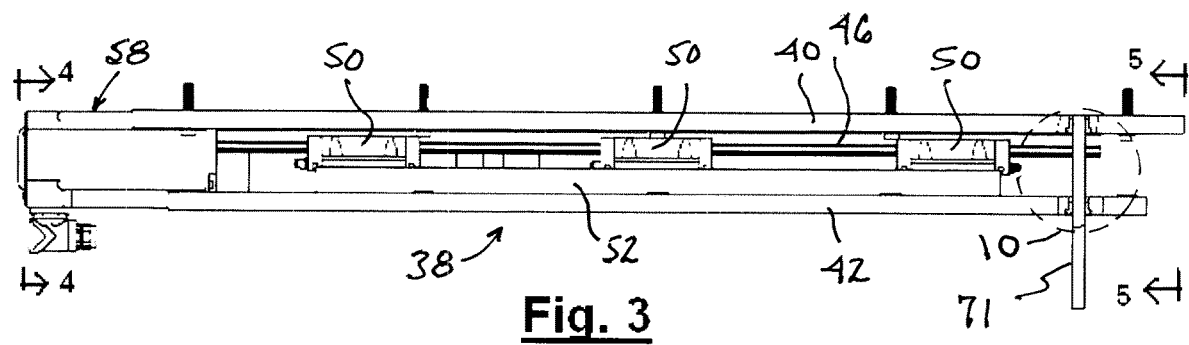
FIG. 3 is an enlarged elevation view of a portion of the plastic welding machine in the direction of arrow 3 in FIG. 2.
Figure 4:
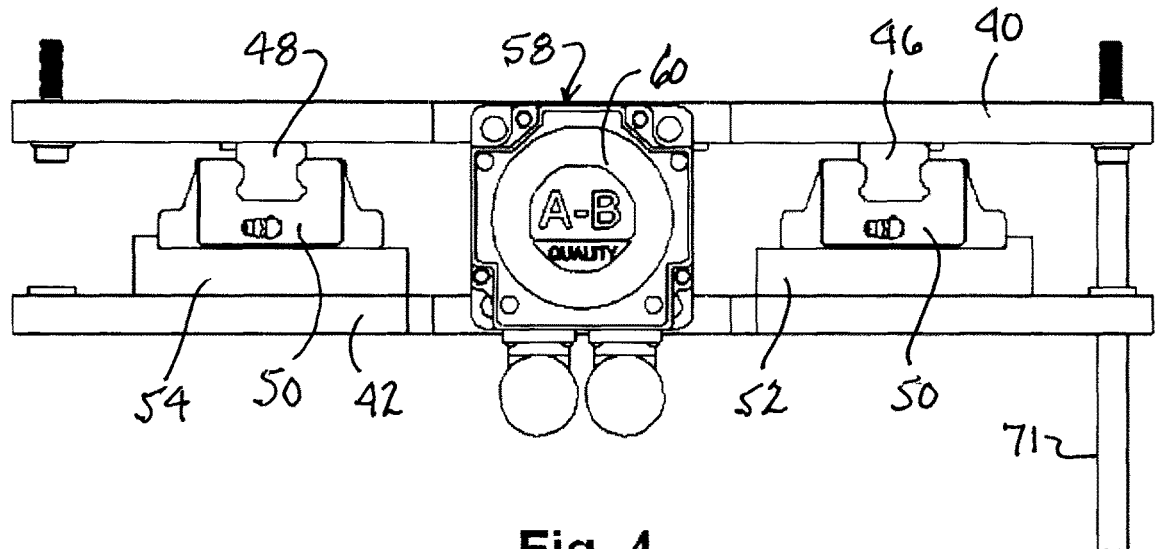
FIG. 4 is an end view in the direction of arrows 4-4 in FIG. 3.
Figure 5:
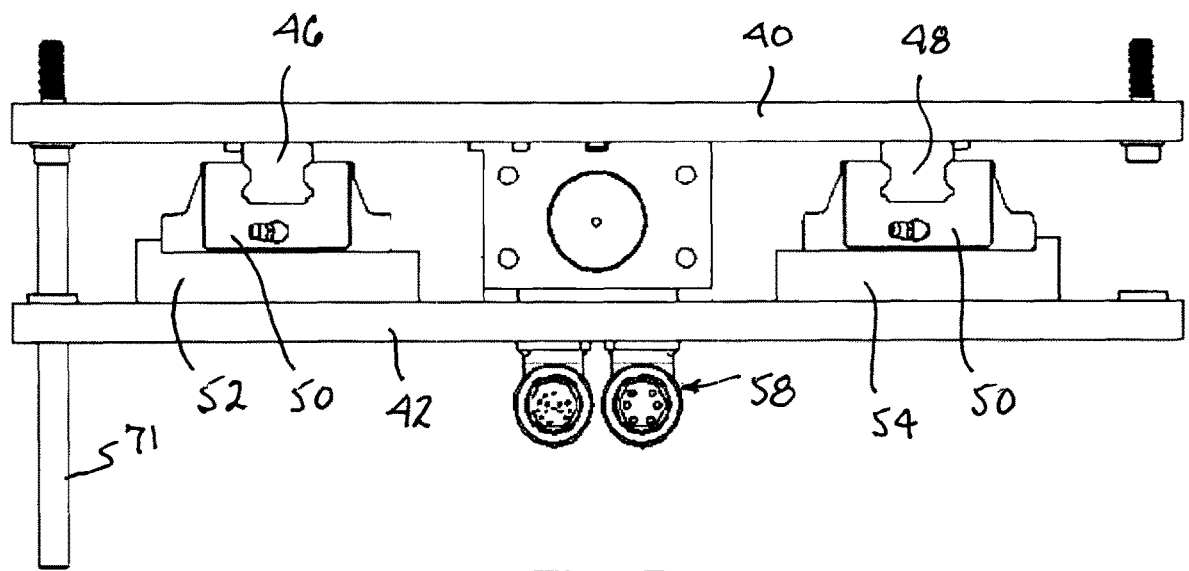
FIG. 5 is an end view in the direction of arrows 5-5 in FIG. 3.

FIG. 1 shows an example of a plastic welding machine 33 comprising an upper platen 34 and a lower platen 35 each of which is independently movable on a frame 37 toward and away from the other in a direction parallel with a main vertical z-axis as suggested by arrow 36. Frame 37 comprises vertical uprights 37A, 37B which are horizontally spaced apart. Parallel rails 39A, 39B of a first rail pair are respectively fastened to uprights 37A, 37B at a higher elevation than are parallel rails 39C, 39D of a second rail pair. A servo motor controlled ball screw actuator 41A moves upper platen 34 vertically up and down on rails 37A, 37B, and a servo motor controlled ball screw actuator 41B moves lower platen 35 vertically up and down on rails 39C, 39D. A slide assembly 38 is fastened to a lower face of upper platen 34. FIG. 2 is an enlarged view of upper platen 34 by itself.

Detail of slide assembly 38 is shown in FIGS. 3-12. Slide assembly 38 comprises a base plate 40 which is disposed against the lower face of upper platen 34 and fastened to upper platen 34. Slide assembly 38 also comprises a tooling plate 42. A tooling half (not shown) is fastened to tooling plate 42 and has a fixture for holding one of two plastic parts which are to be welded together. The plastic parts are also not shown. Another tooling half (also not shown) is fastened to the upper face of lower platen 35 and has a fixture for holding the other of the two plastic parts which are to be welded together.

Figure 6:
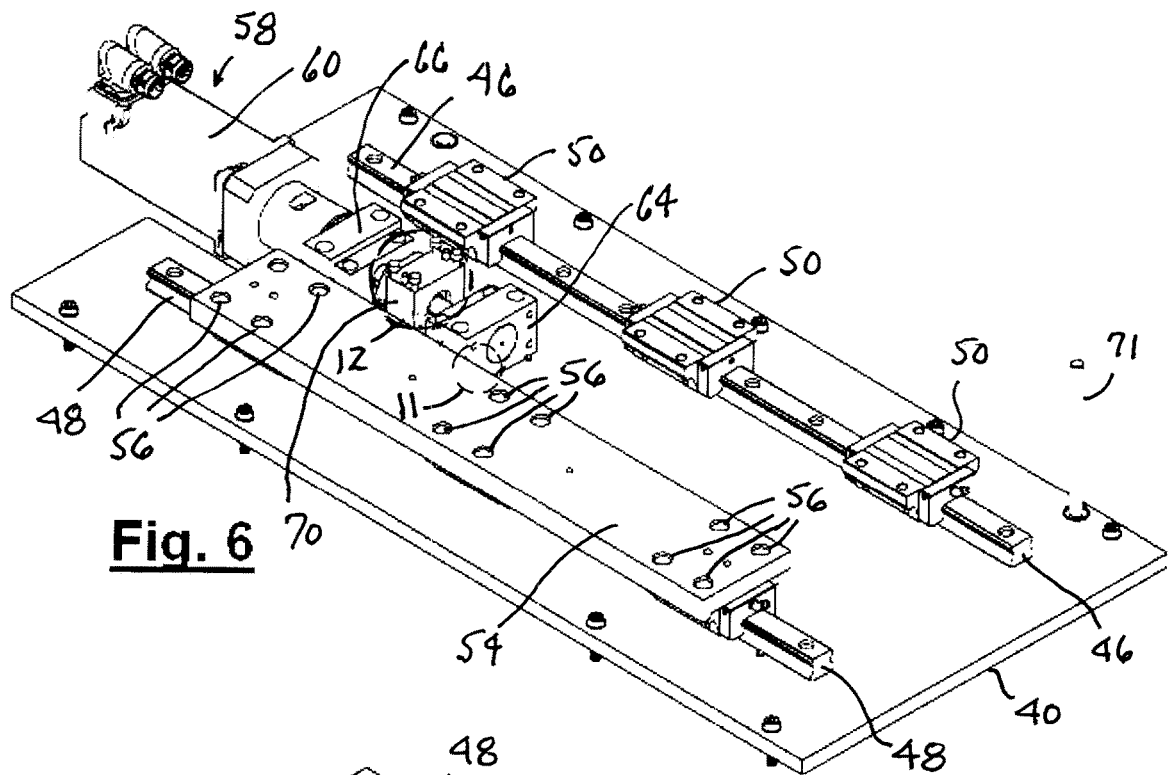
FIG. 6 is an enlarged perspective view of a portion of FIG. 3 turned upside down and with some parts removed for clarity of illustration.
Figure 7:
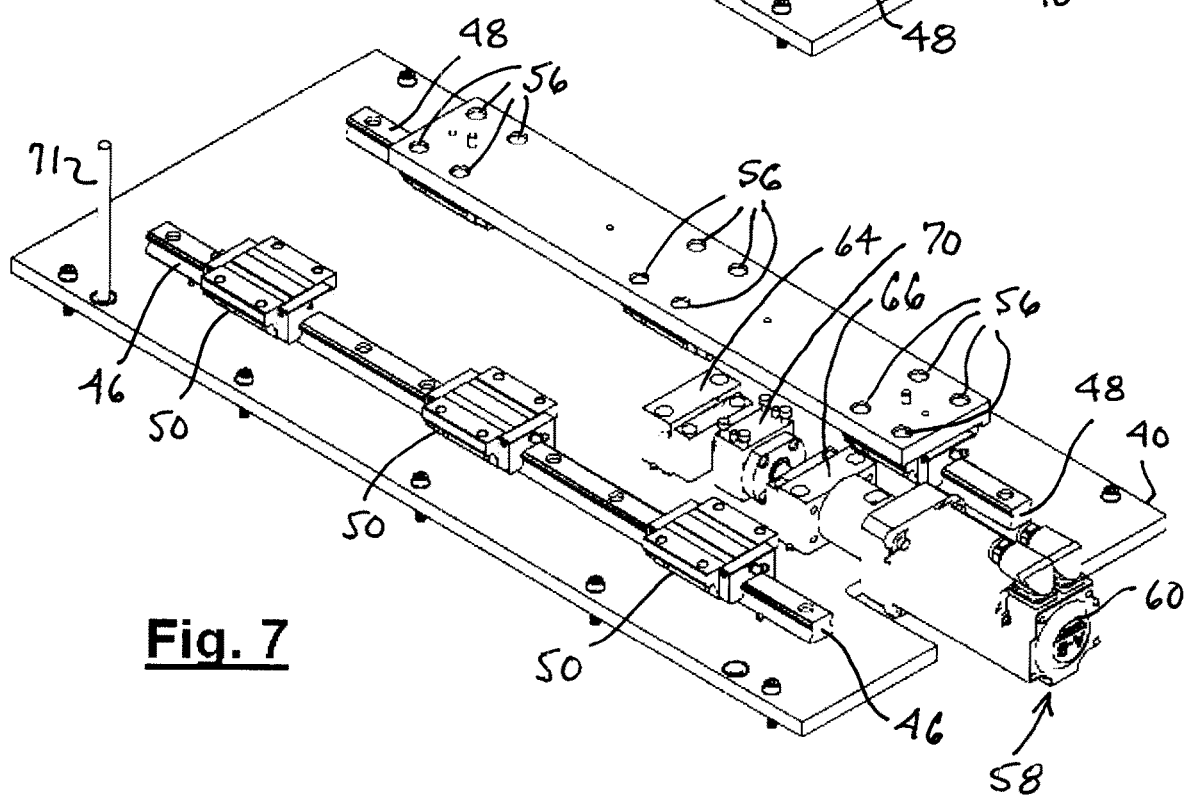
FIG. 7 is a view of FIG. 6 rotated 180°.

While tooling plate 42 is removed from FIGS. 6 and 7 for clarity of illustration, tooling plate 42 appears in other Figs. Tooling plate 42 is movable relative to base plate 40 in a direction parallel with an x-axis and perpendicular to the z-axis as suggested by arrow 44 in FIG. 2. Two parallel rails 46, 48 extend lengthwise parallel with the x-axis and are disposed against a lower face of, and fastened to, base plate 40. Three bearing assemblies 50 can slide along each rail 46, 48 in directions parallel with the x-axis. The bearing assemblies 50 which can slide along rail 46 are separated from tooling plate 42 by a spacer bar 52 which is also removed from FIGS. 6 and 7 for clarity of illustration. The bearing assemblies 50 which can slide along rail 48 are separated from tooling plate 42 by a spacer bar 54. Fasteners (not shown) pass through clearance holes 56 in spacer bars 52, 54 to fasten bearing assemblies 50 associated with each rail to tooling plate 42. Because bearing assemblies 50 are constrained by their engagements with rails 46, 48 to move in a direction along each rail 46, 48 parallel with the x-axis, tooling plate 42 is constrained to move relative to base plate 40 also in a direction parallel with the x-axis.

Also mounted on base plate 40 is a servo driven actuator 58 for moving tooling plate 42 along rails 46, 48. Servo driven actuator 58 is shown in greater detail in FIGS. 8, 9, and 12 to comprise a servo motor 60 whose output shaft is parallel the x-axis and is coaxially coupled with one end of a ball screw 62 whose axis is coaxial with that of servo motor 60 so that the axis of ball screw 62 is also parallel with the x-axis.

Ball screw 62 is supported at two different locations along its length by two bearing assemblies 64, 66 which are mounted on base plate 40. Between its two points of support by bearing assemblies 64, 66, ball screw 62 is engaged with a nut 68. Nut 68 is non-rotatably mounted within a housing 70 which is fastened to tooling plate 42. Consequently when servo motor 60 turns ball screw 62, ball screw 62 imparts x-axis motion to tooling plate 42 through mechanical interaction with nut 68 because nut 68 cannot rotate within housing 70 and housing 70 is fastened to tooling plate 42. Because servo motor 60 is bi-directional, it is capable of moving tooling plate 42 in either of two opposite directions parallel with the x-axis.

Figure 11:
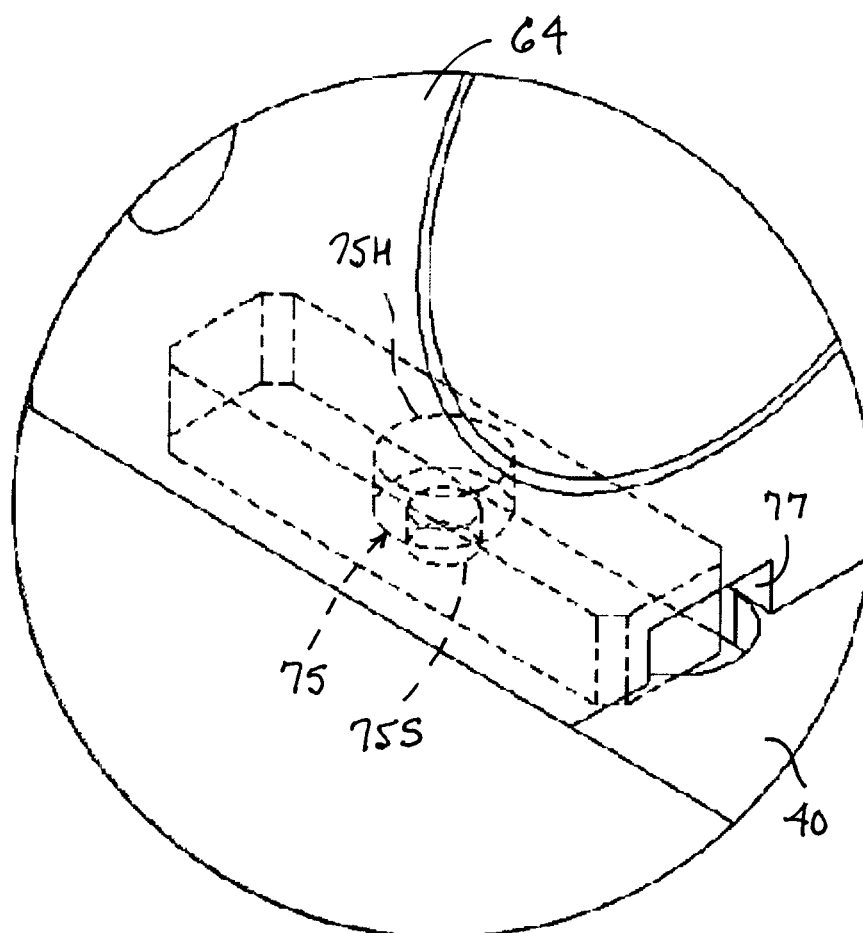
FIG. 11 is an enlarged view in circle 11 of FIG. 6 showing detail which cannot be seen in FIG. 7.
Figure 12:
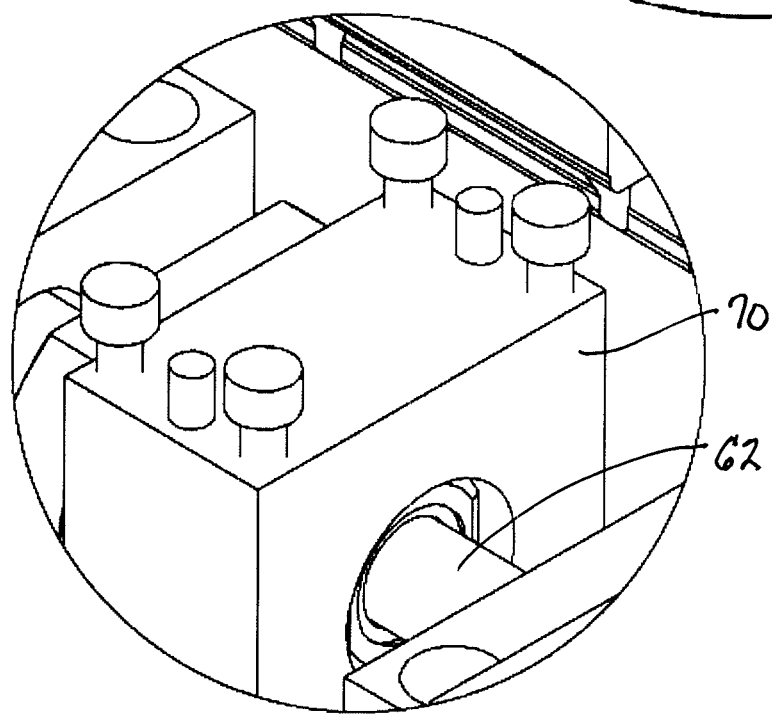
FIG. 12 is an enlarged view in circle 12 of FIG. 6.

How the axis of ball screw 62 is made parallel with the x-axis will be explained with reference to FIG. 11. FIG. 11 shows a part 75 having a circular cylindrical head 75H and a circular cylindrical shank 75S which is fit to a circular hole in base plate 40 to one side of ball screw 62 so that the outer margin of head 75H is disposed flat against the lower surface of base plate 40. A part identical to part 75 is fit to another hole in base plate 40 to the opposite side of ball screw 62 in the same way. FIG. 11 also shows one of two slots 77 which have been machined in the bottom surface of the housing of bearing assembly 64 to either side of ball screw 62. Each slot 77 has a length parallel with the x-axis and opposite side surfaces which face each other and lie in parallel planes which are parallel with the axis of ball screw 62. The width of each slot 77 is just large enough to allow the head 75H of the respective part 75 to fit to the respective slot. Heads 75H are spaced a distance apart from each other which allows each head to precisely fit between opposite sides of the respective slot when servo driven actuator 58 is being assembled to base plate 40 thereby assuring that the axis of ball screw 62 is parallel with the x-axis.

FIG. 10 shows detail of a dowel 71 which is used for setting slide assembly 38 to upper platen 34. It is also used to set tooling plate 42 to base plate 40 during assembly of tooling plate 42 to base plate 40 by properly locating tooling plate 42 to base plate 40 at an initial phase of assembly before bearing assemblies 50 are fastened to tooling plate 42. Dowel 71 fits with precision to bushings 71A, 71B which are precisely located in the respective plates 40, 42, and when placed in the bushing of one plate, dowel 71 will fit to the bushing of the other plate only when the bushings are in precise coaxial alignment in a direction along the z-axis. Proper alignment of the two plates in a circumferential direction around dowel 71 will result in proper location of bearing assemblies 50 to tooling plate 42 to allow bearing assemblies 50 to be fastened to tooling plate 42.

For welding two plastic parts together, one part is fixtured in a tooling half mounted on one platen and the other part is fixtured in a tooling half mounted on the other platen. Placement of the parts in their tooling half fixtures may be performed manually by a person operating welding machine 33 or by an industrial robot (not shown) whose operation is controlled in coordination with that of welding machine 33.

An initial step in plastic welding comprises heating surfaces of the plastic parts at locations where a weld joint is to be created. That step can be performed by moving platens 34, 35 to positions which place the surfaces to be heated sufficiently far enough apart to allow a heat source tool 72 (FIG. 1), such as a hot plate having three-dimensional heating surfaces, to be placed between the plastic parts. The plastic parts are aligned in the x-axis direction and in a y-axis direction which is perpendicular to both x-axis and z-axis directions so that the weld joint locations on both fixture plastic parts mutually align in an x,y plane. One or both platens 34, 35 is or are then moved other to place the fixtured plastic parts in contact with, or sufficiently close to, the heat source tool to melt the plastic of each part along the weld joint location. After sufficient melting of the plastic of both parts, one or both platens 34, 35 move away from each other to locations which allow the heat source tool to be removed from between the parts. Movement of the heat source tool may be performed by an industrial robot in coordination with operation of welding machine 33.

With melting of plastic along the weld joint locations on the parts having been completed, one or both platens is or are then moved in the z-axis direction to place the plastic parts together and force their melt pools to merge by applying force in a direction parallel with the z-axis (i.e. a z-axis weld force vector). With the melt pools beginning to merge, servo-driven actuator 58 then operates to cause force to be applied to the weld joint in a direction parallel with the x-axis (i.e. an x-axis weld force vector). By controlling the magnitudes of the weld forces being applied by the z-axis and x-axis weld force vectors, direction and magnitude of the resultant weld force vector can be controlled.

Figure 17:
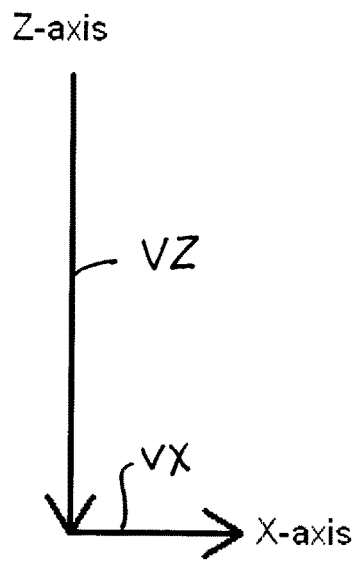
FIGS. 17 and 18 are vector diagrams for explaining certain principles of the present invention.
Figure 18:
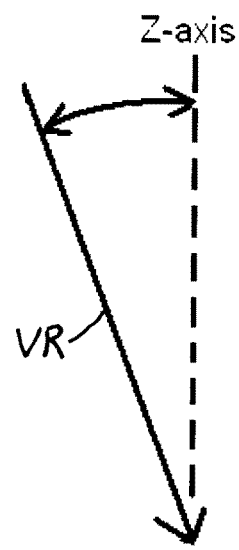

This is diagrammatically illustrated in FIGS. 17 and 18 where z-axis force being applied by platens 34, 35 to force the melt pools together is represented by vector VZ, x-axis force being applied by tooling plate 42 is represented by vector VX, and the resultant weld force vector is represented by the vector VR. Because the magnitude and/or direction of vector VR is a function of the magnitude of the z-axis force and the magnitude of the x-axis force, changing the magnitude of the z-axis force and that of the x-axis force changes magnitude and direction of resultant vector VR. A controller coordinates x-axis force and z-axis force being applied to the weld joint by coordinating control of servo-driven actuator 58 with control of servo drives 41A, 41B to create a desired direction and magnitude for resultant weld force vector VR.

Figure 13:
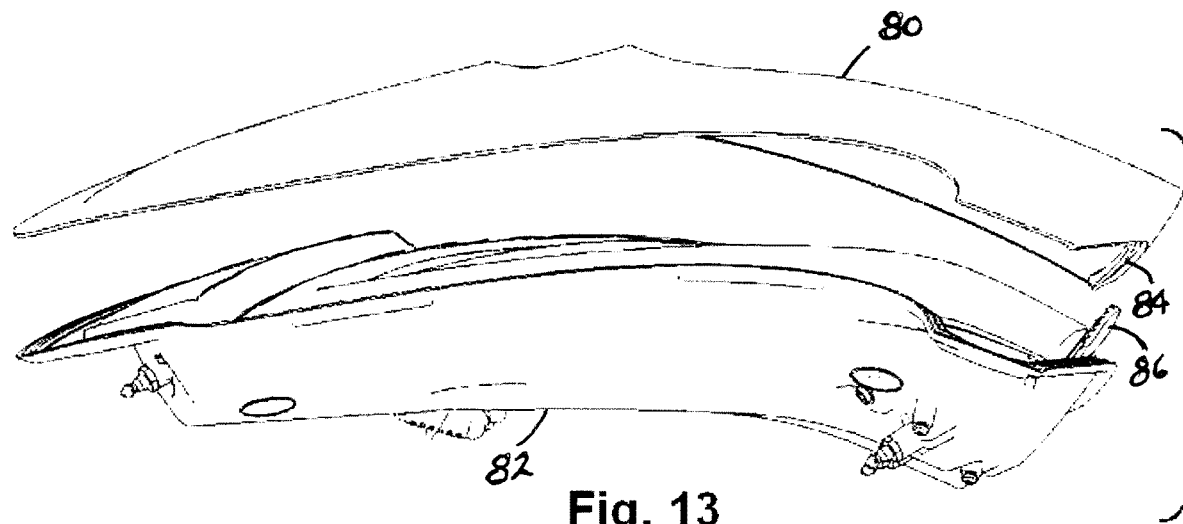
FIG. 13 is a perspective view of two plastic parts which are to be welded together.
Figure 14:
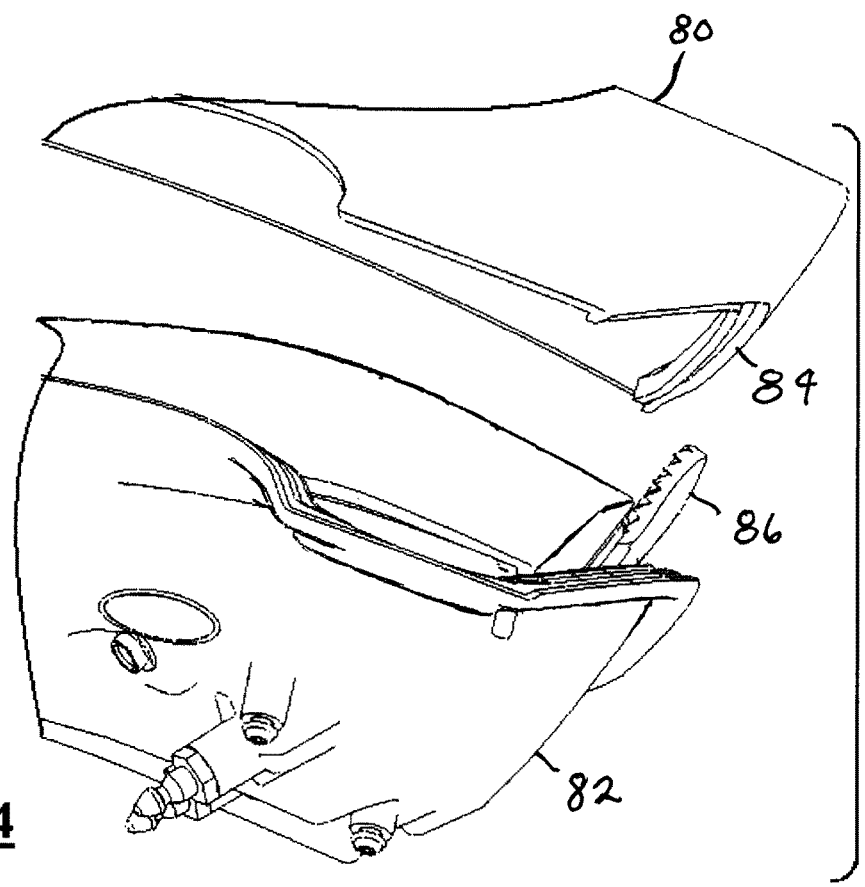
FIG. 14 is an enlarged view of a portion of FIG. 13.

The ability to control the direction and magnitude of a weld force vector in a plastic welding operation is advantageous when the plastic parts have complex three-dimensional weld joint shapes. FIGS. 13 and 14 illustrate parts 80, 82 which have been placed in a position which provides a slightly concave/convex three-dimensional weld joint for welding the parts together using only a z-axis force. However, the designs of those particular parts have features 84, 86 which preclude welding because those features would interfere with each other if the parts were to be moved toward each other only in the z-axis direction.

Figure 15:
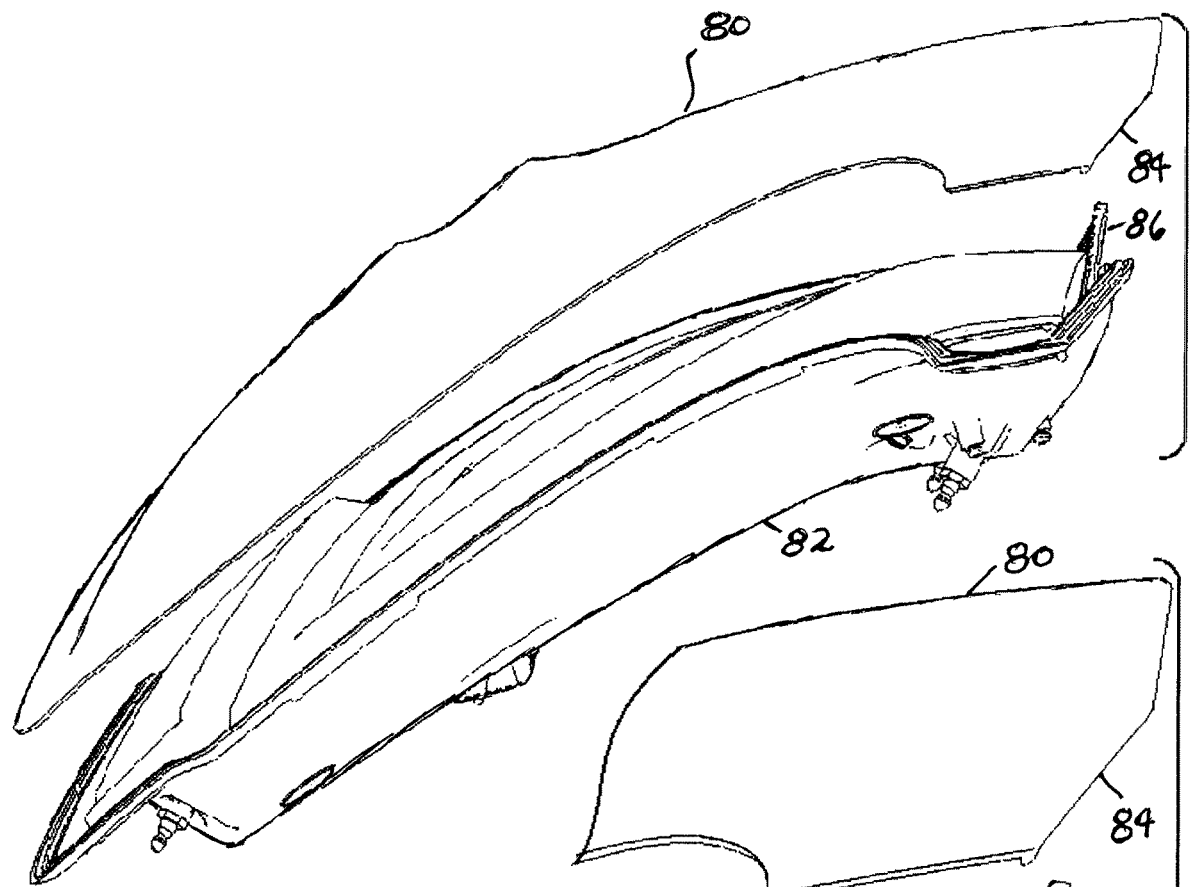
FIG. 15 is a perspective view of the two plastic parts of FIG. 13 turned counterclockwise.
Figure 16:
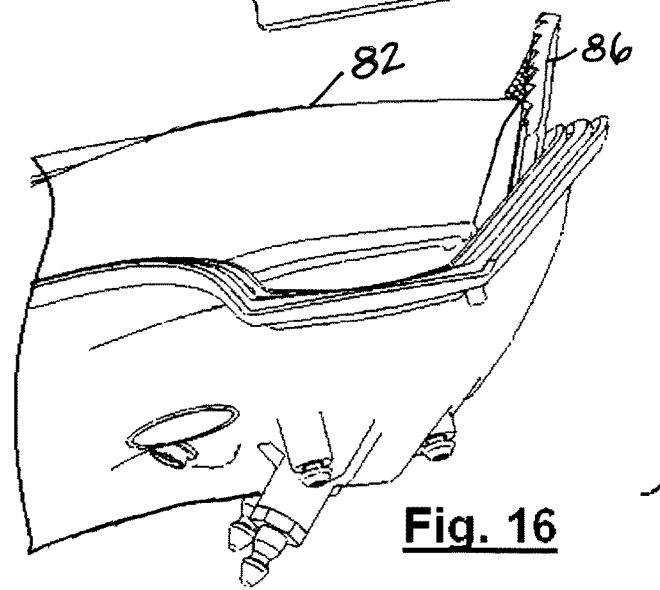
FIG. 16 is an enlarged view of a portion of FIG. 15.

Reorienting the parts as shown in FIGS. 15 and 16 removes the interference, but has the undesired consequence of converting the three-dimensional weld joint in FIGS. 13 and 14 into a shape which is not conducive for reliable mass production in a welding machine that can apply only a z-axis weld force vector. Reliable mass-production is compromised because in the position of FIGS. 15 and 16, the weld joint assumes a much more vertical orientation at the left end portions of the parts than in the position of FIGS. 13 and 14. That more vertical orientation causes the component of z-axis force which is normal to the surfaces at those left end portions to be much smaller than the component at the right end portions.

By operating slide assembly 38 to impart an x-axis force component in coordination with a z-axis force component being applied by platens 34, 35, the resultant weld force vector which is being applied to the entire weld joint can be made sufficiently large in a suitable direction to achieve desired quality for mass-produced welded parts. A resultant weld force vector being applied to the plastic parts can remain constant in both magnitude and direction during the entire time that the parts are being forced together, or its magnitude and/or direction may change while the parts are being forced together.

Figure 21:
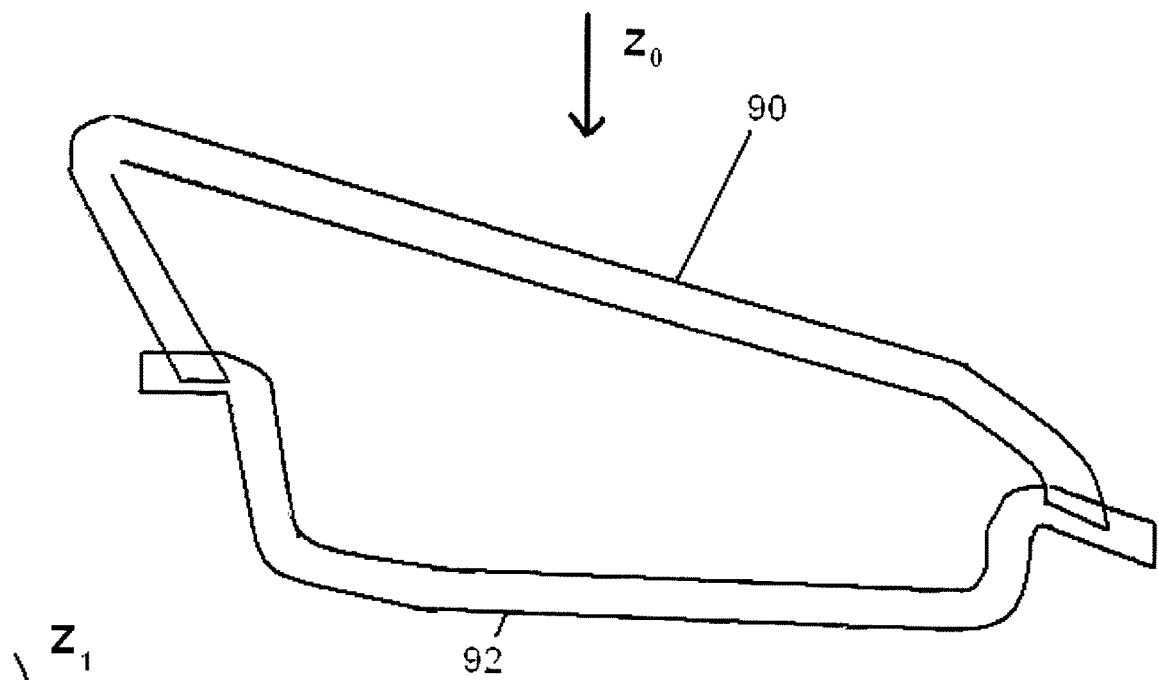
FIGS. 21-22 are cross section views illustrating two other plastic parts which are being welded together.
Figure 22:
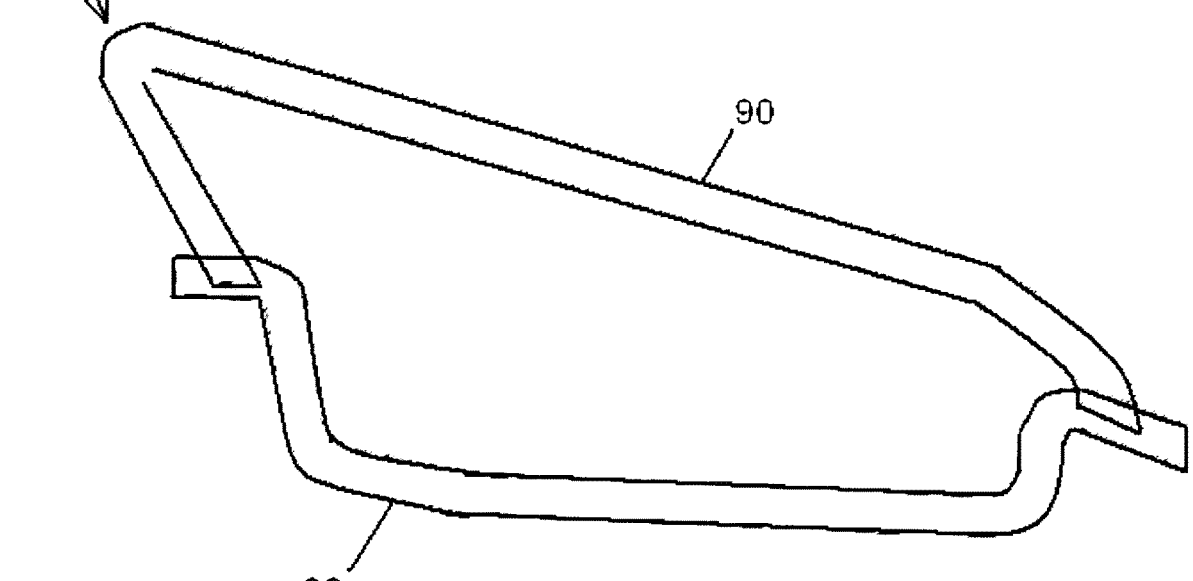

FIGS. 21-22 illustrate an example of the latter for two parts 90 and 92 being welded together. The right side of part 90 is being forced against a flange of part 92 by only a z-axis force vector $Z_0$ to create a proper weld joint at that location. Because the wall of part 90 on the left side is inclined to the direction of force vector $Z_0$, it may not be properly welded to part 90 using only z-axis force. At some point during the time before the melt pools of the weld joint of the respective parts at the right and left solidify, the direction of the resultant weld force vector is changed from $Z_0$ to $Z_1$ by using slide assembly 38 to apply force in a direction parallel with the x-axis The resultant force $Z_1$ better aligns with the wall of part 90 on the left side as suggested by FIG. 22, allowing that wall of part 90 to become properly joined with part 92. Force $Z_1$ may cause the melts on the right side to smear slightly but that won't affect integrity of the finished weld joint.

Figure 23:
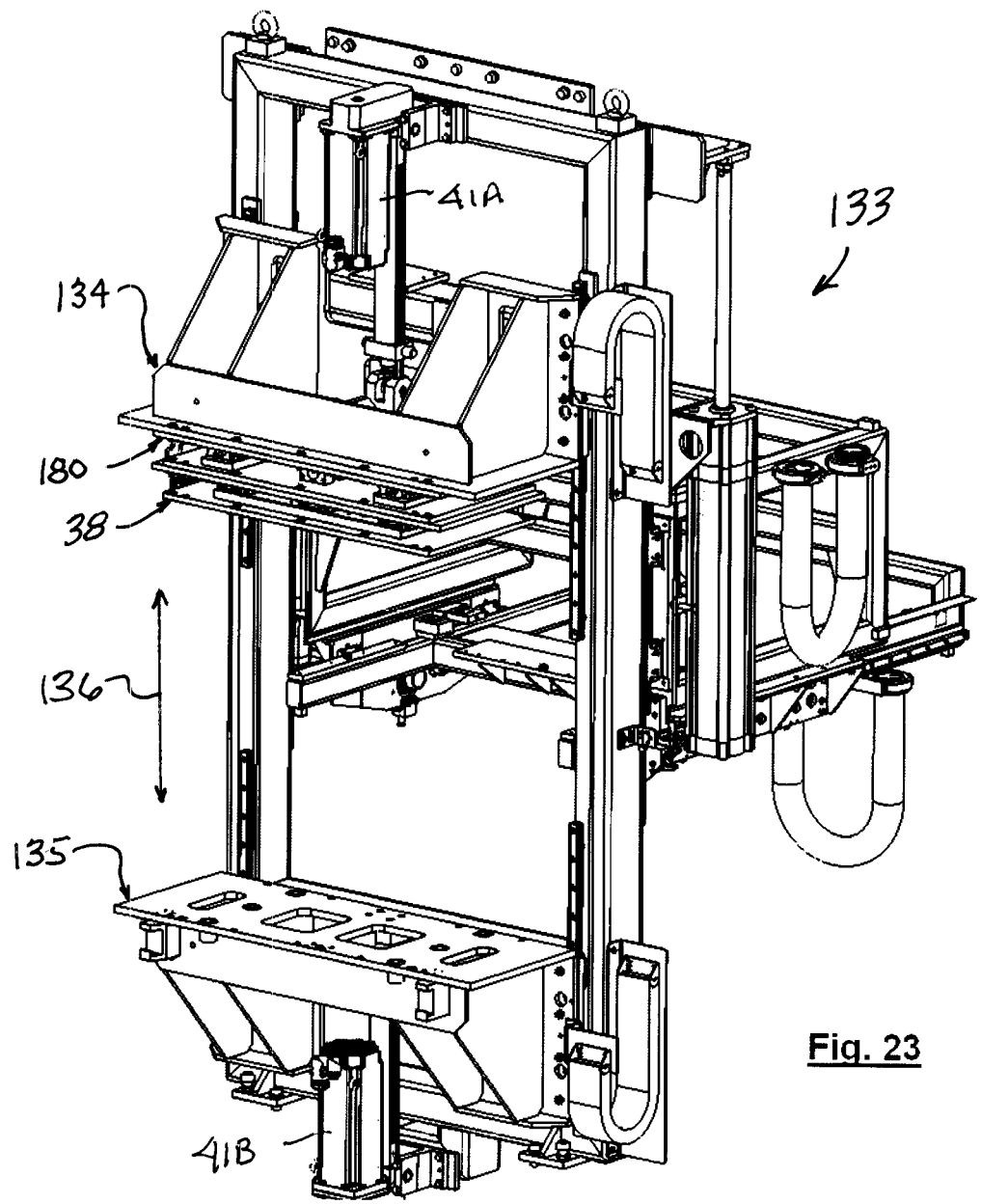
FIG. 23 is a perspective view of a portion of another plastic welding machine, looking from the right front toward the left rear of the machine.
Figure 24:
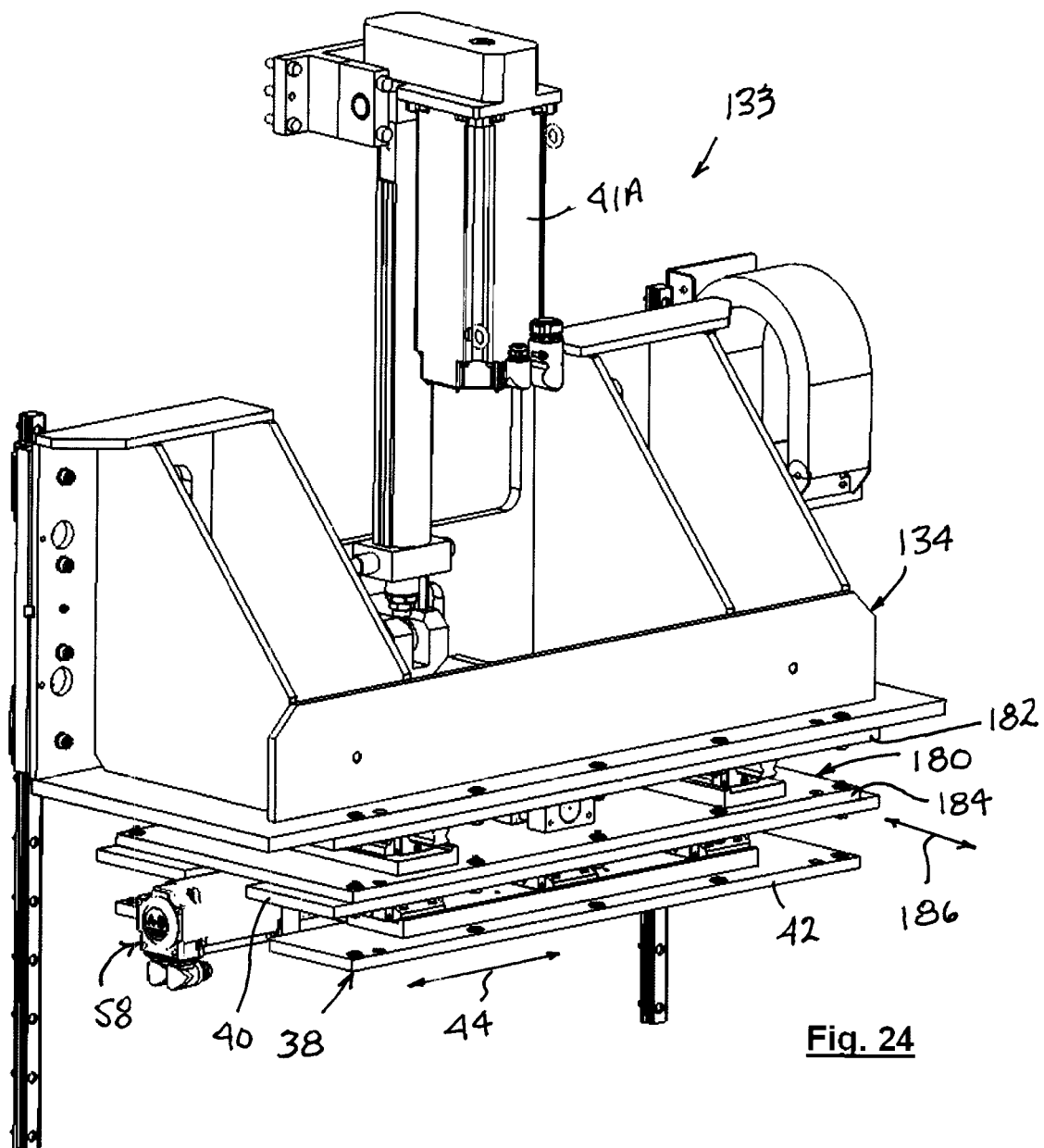
FIG. 24 is a perspective view of a portion of FIG. 23 on a larger scale, looking from the left front toward the right rear of the machine.
Figure 25:
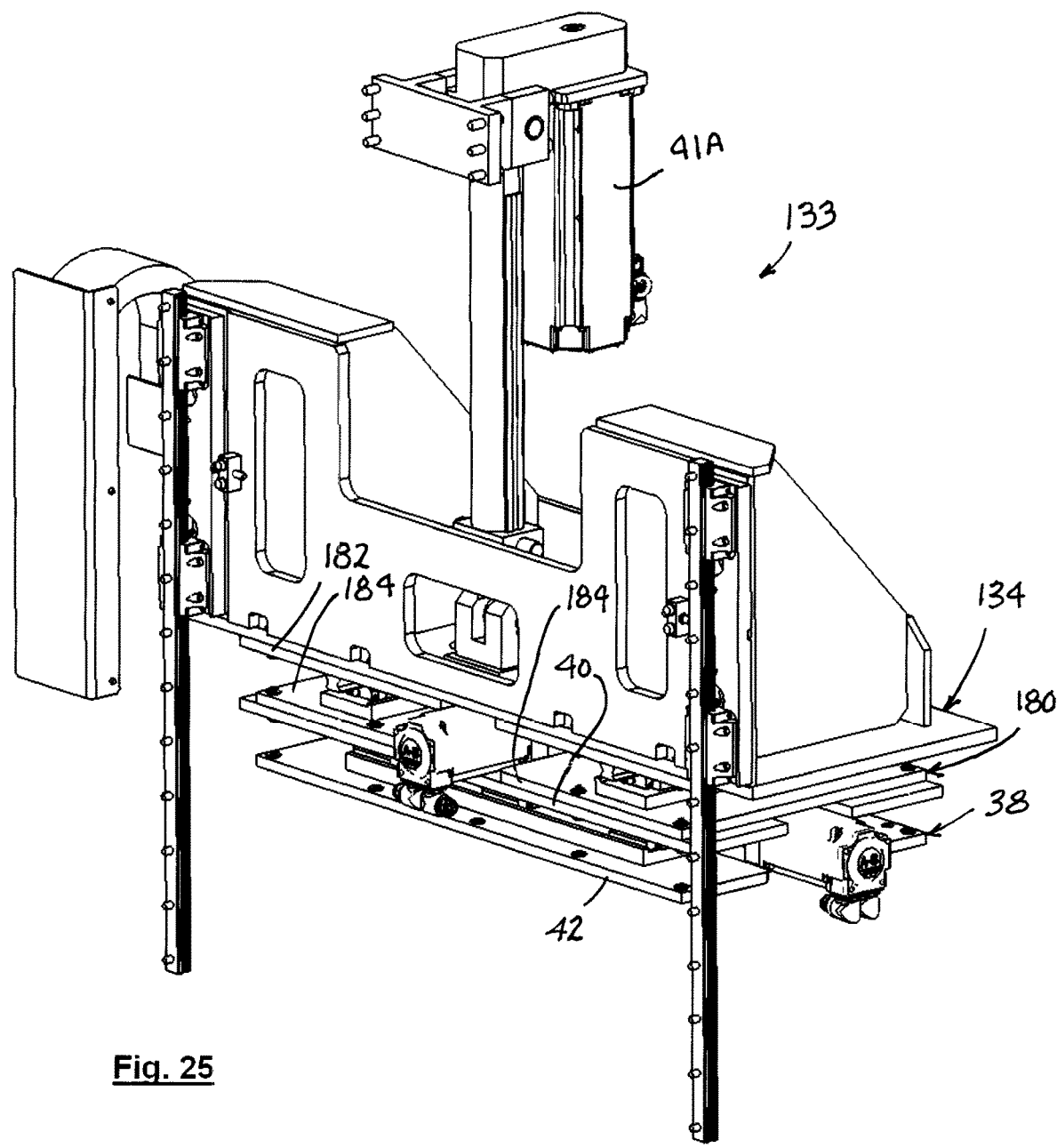
FIG. 25 is a perspective view of FIG. 24 looking from the left rear toward the right front of the machine.
Figure 26:
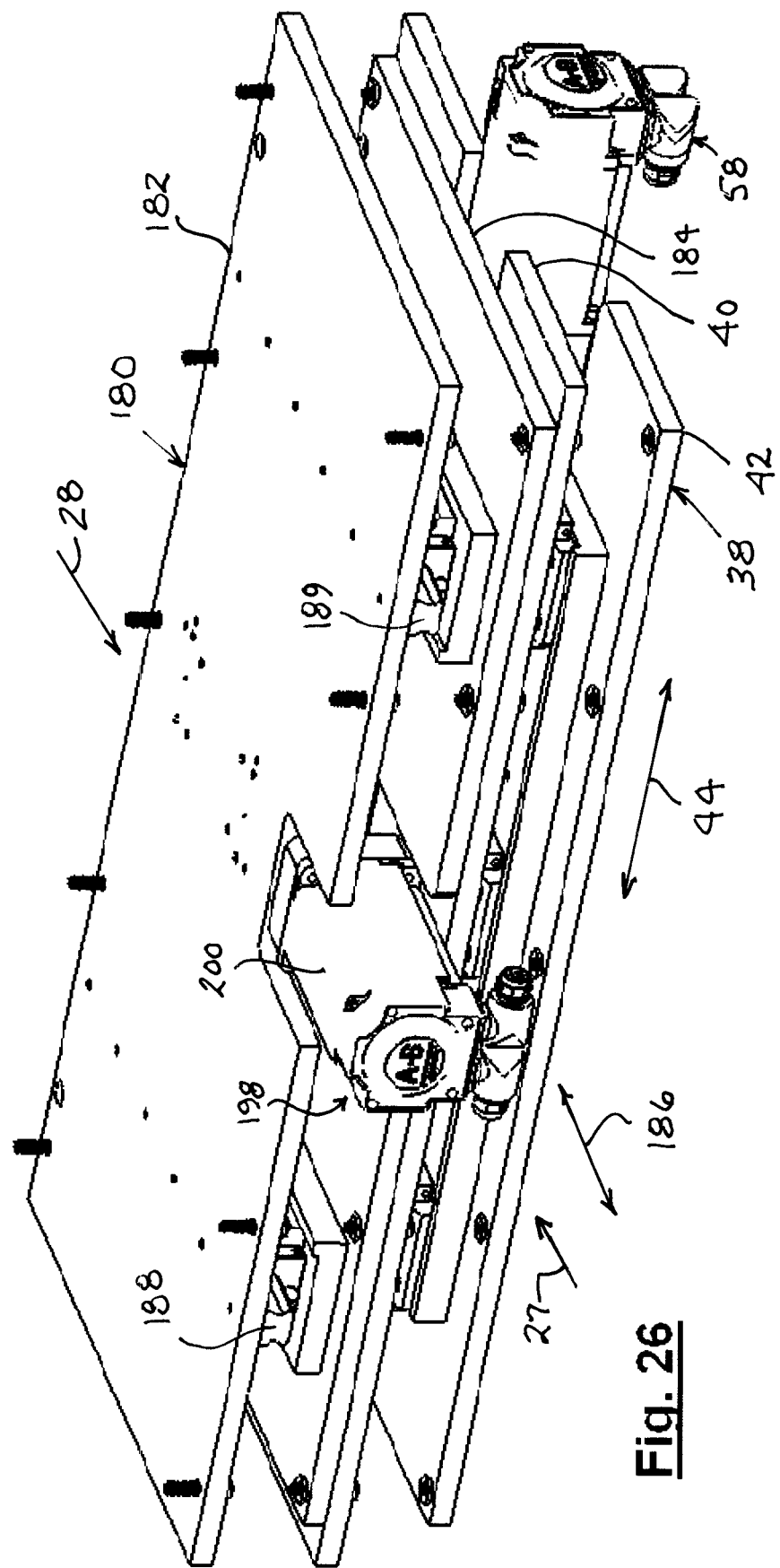
FIG. 26 is an enlarged perspective view of a portion of FIG. 25 shown by itself apart from the welding machine, looking from the left rear toward the right front.
Figure 29:
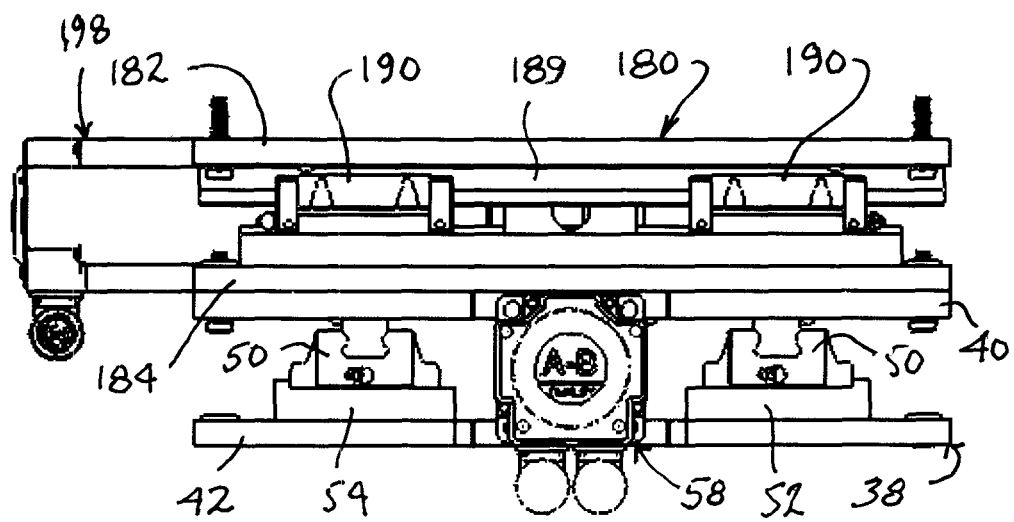
FIG. 29 is an enlarged end view in the direction of arrows 29-29 in FIG. 28.
Figure 30:
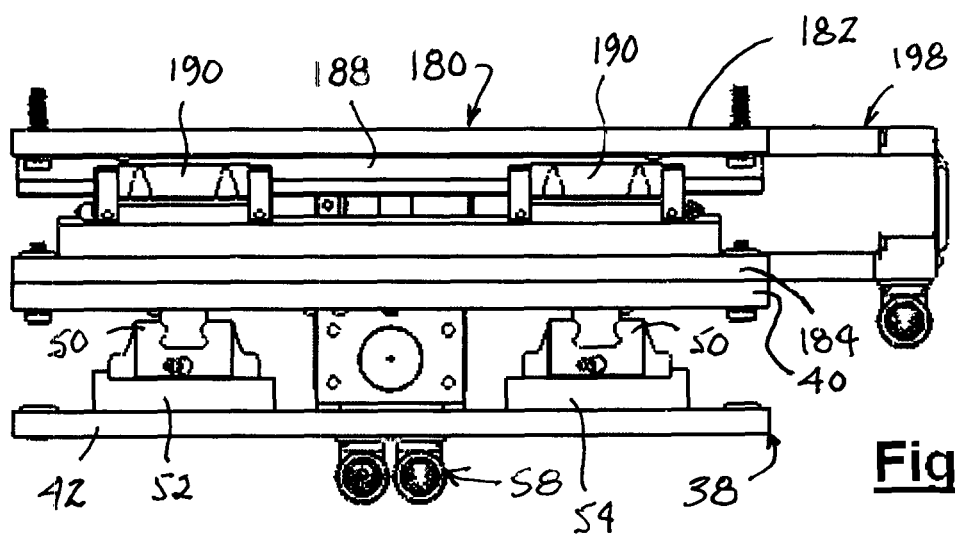
FIG. 30 is an enlarged end view in the direction of arrows 30-30 in FIG. 28.
Figure 31:
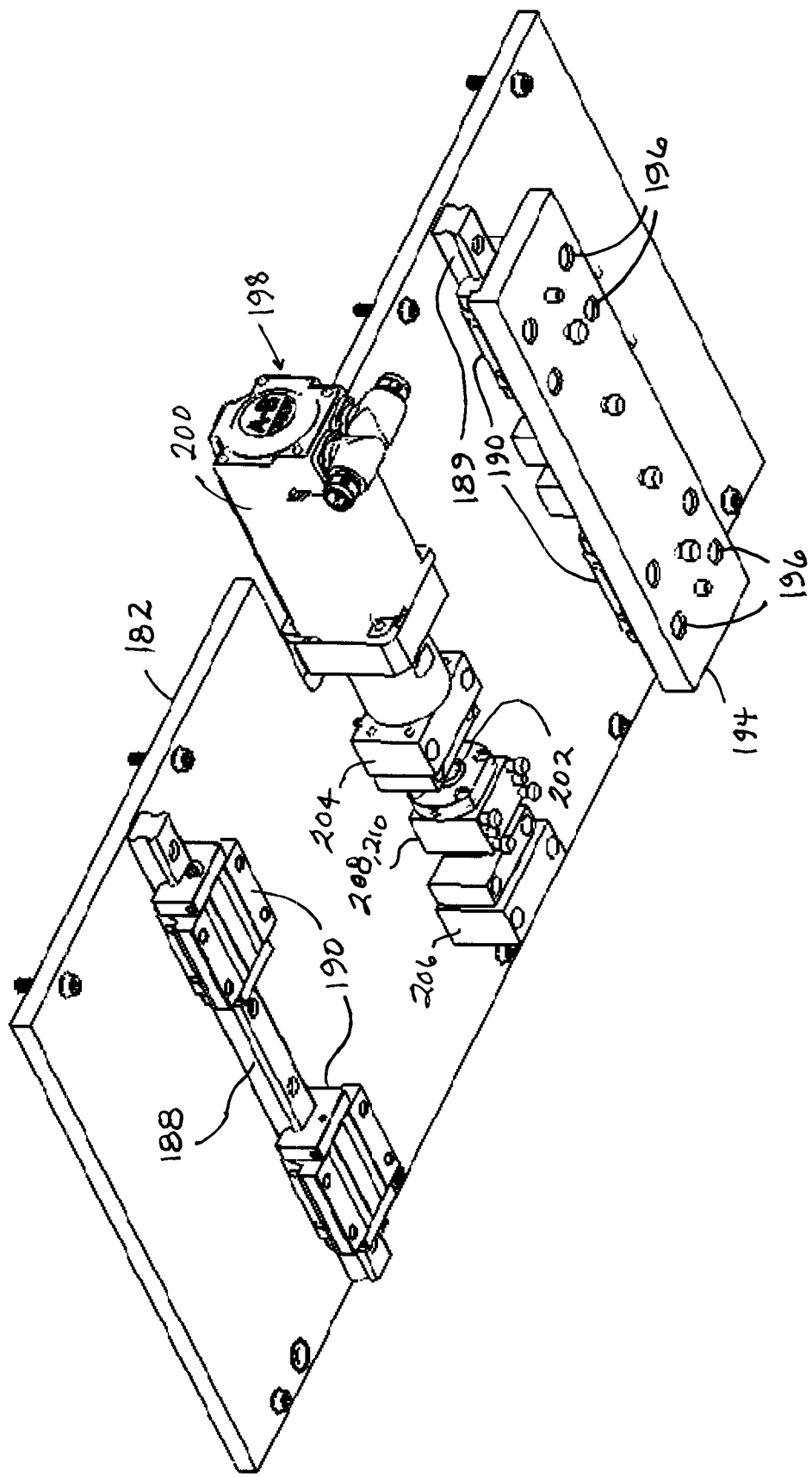
FIG. 31 is a perspective view of a portion of FIG. 26 which has been removed from FIG. 26 and turned upside down, some parts having been removed for clarity of illustration.
Figure 32:
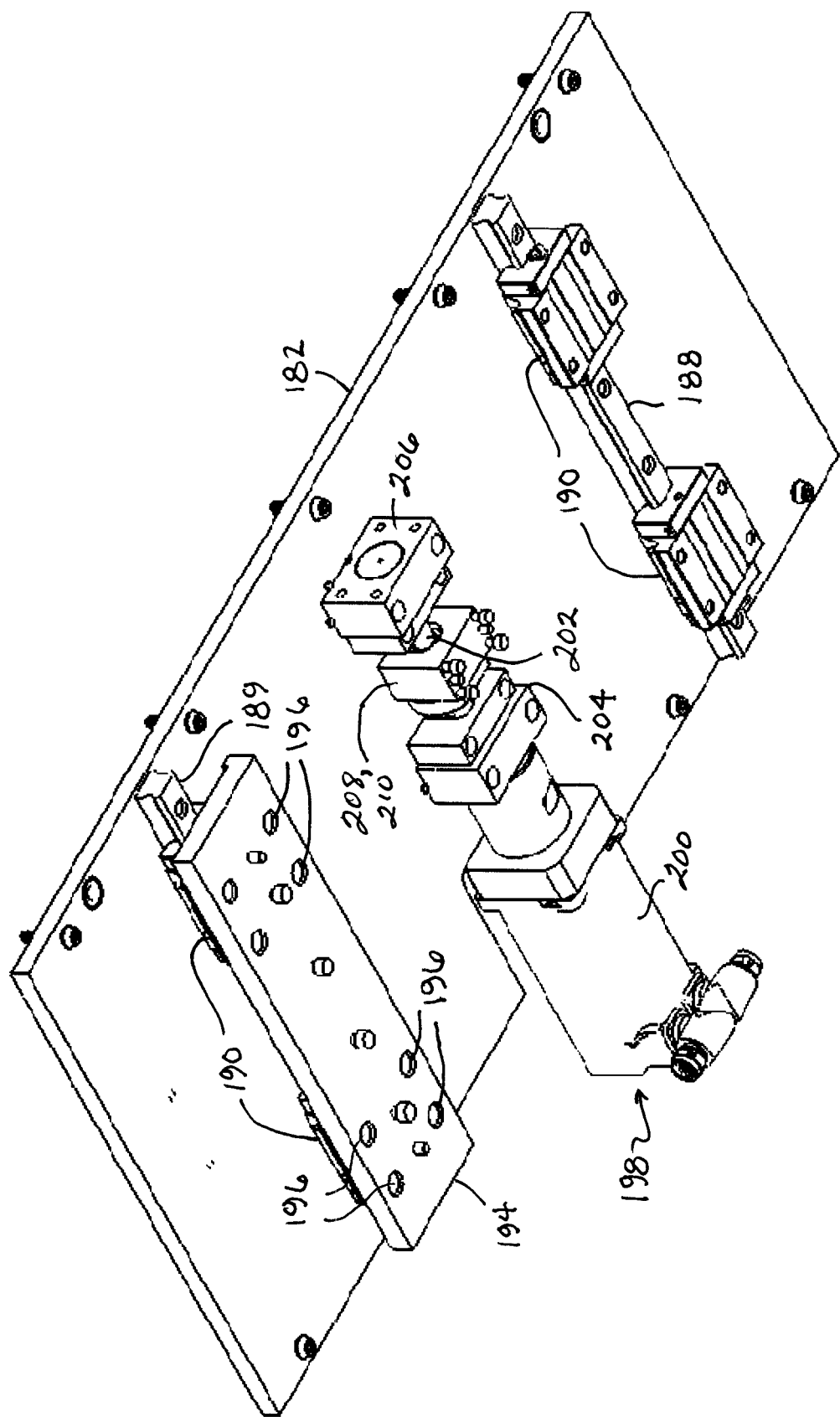
FIG. 32 is a view of FIG. 31 looking from a different direction.
Figure 33:
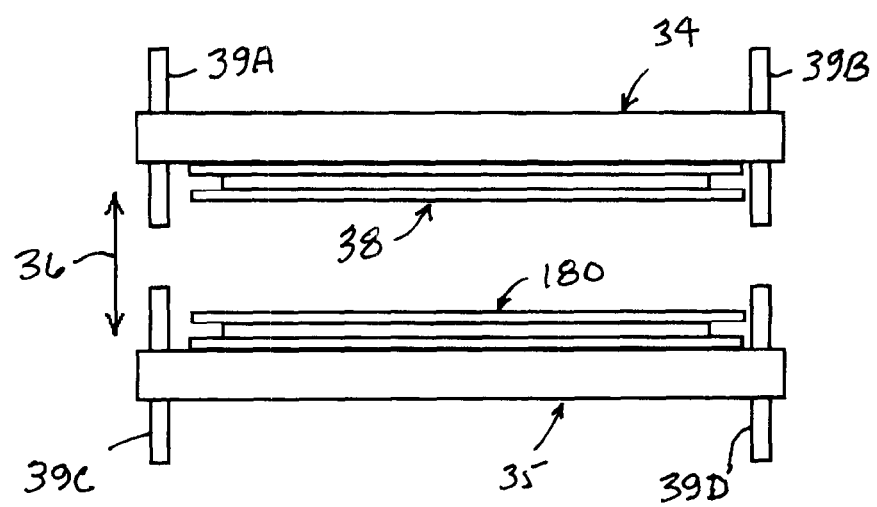
FIG. 33 is a schematic front view of another welding machine.

FIG. 23 shows another plastic welding machine 133 having an upper platen 134 and a lower platen 135 which are relatively movable along a vertical z-axis as suggested by arrow 36. Like machine 33, machine 133 comprises servo motor controlled ball screw drives 41A, 41b and a slide assembly 38 which in all material respects is like the one described above, but unlike machine 33, machine 133 has a second slide assembly 180 fastened to upper platen 134, and slide assembly 38 is fastened to slide assembly 180.

As shown by FIGS. 24-32 slide assembly 180 comprises a base plate 182 which is disposed against, and fastened to, upper platen 134 and a tooling plate 184 against which base plate 40 of slide assembly 38 is disposed and fastened to. A tooling half (not shown) for fixturing one of two plastic parts which are to be welded together remains mounted on tooling plate 42 of slide assembly 38. Another tooling half (also not shown) for fixturing the other of the two plastic parts is mounted on lower platen 135.

Tooling plate 42 continues to be movable relative to base plate 40 in a direction parallel with the x-axis and perpendicular to the z-axis as suggested by arrow 44. Slide assembly 180 functions to move slide assembly 38 in a direction parallel with the y-axis as suggested by arrow 186 and perpendicular to both the x-axis and the z-axis.

Slide assembly 180 further comprises two parallel rails 188, 189 which extend lengthwise parallel with the y-axis and are fastened to base plate 182. Two bearing assemblies 190 can slide along each rail 188, 189 parallel with the y-axis. The bearing assemblies 190 which can slide along rail 188 are separated from tooling plate 184 by a spacer bar 192 which removed from FIGS. 31 and 32 for clarity of illustration. The bearing assemblies 190 which can slide along rail 189 are separated from tooling plate 184 by a spacer bar 194. Fasteners fasten the bearing assemblies 190 associated each rail to base plate 182 by passing through clearance holes 196 in spacer bars 192, 194. With bearing assemblies 190 secured to tooling plate 184, tooling plate 184 can move relative to base plate 182 along a direction parallel with the y-axis.

Also mounted on base plate 182 is a servo driven actuator 198 for moving tooling plate 184 on base plate 182. Servo driven actuator 198 is shown in greater detail in FIGS. 31 and 32 to comprise a servo motor 200 whose output shaft is parallel with the y-axis and is coaxially coupled with one end of a ball screw 202. Ball screw 202 is supported at two different locations along its length by two bearing assemblies 204, 206 which are mounted on base plate 182. Between its two points of support by bearing assemblies 204, 206, ball screw 202 is engaged with a nut 208. Nut 208 is non-rotatably mounted within a housing 210 (like nut 68 in housing 70 of servo driven actuator 58). Housing 210 is disposed on, and fastened to, tooling plate 184 to align the axis of ball screw 202 parallel with the y-axis, in the same way as housing 70 aligns ball screw 62 parallel with the x-axis. Consequently when servo motor 200 turns ball screw 202, ball screw 202 impart motion to tooling plate 184 through nut 208 and housing 210 in a direction parallel with the y-axis. Because servo motor 200 is bi-directional, it is capable of moving tooling plate 184 in either of two opposite directions parallel with the y-axis.

Figure 19:
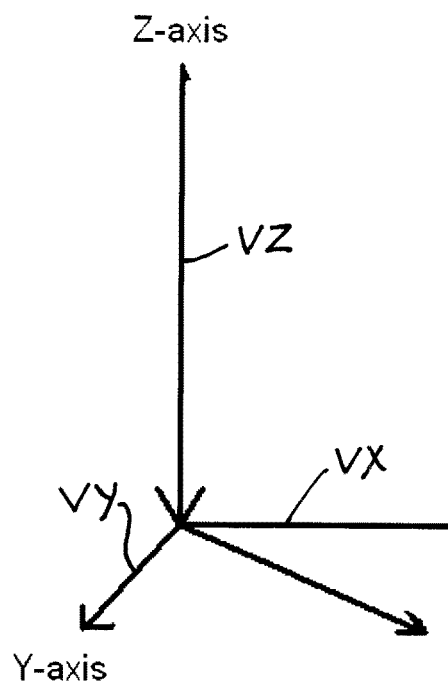
FIGS. 19 and 20 are vector diagrams for explaining certain additional principles of the present invention.
Figure 20:
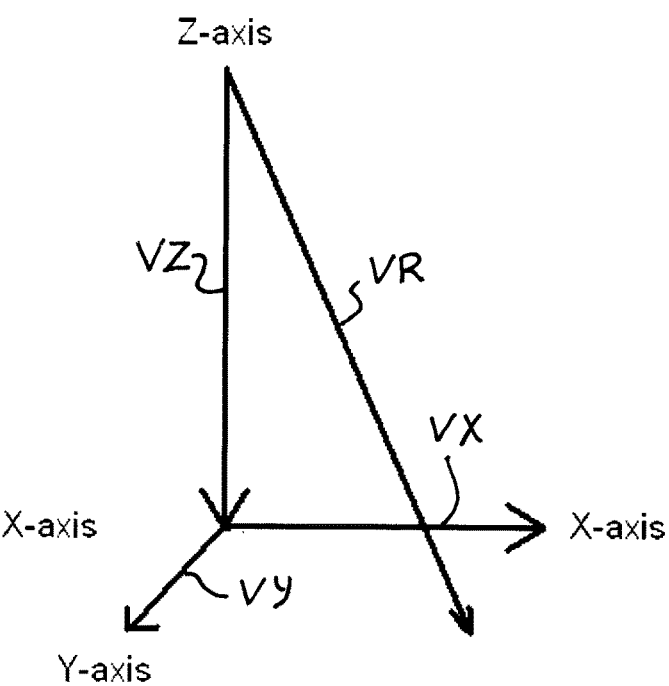

With base plate 40 of slide assembly 38 fastened to upper platen 34 and base plate of slide assembly 180 fastened to tooling plate 42 of slide assembly 38, welding machine 133 is able to control direction and magnitude of the weld force vector when joining a first plastic part to a second plastic part after respective weld joint locations on both plastic parts have been melted and the parts are placed together. In machine 133, the weld force vector is a function of z-axis force being applied to the plastic parts by platens 134, 135, x-axis force being applied to the parts by tooling plate 42 acting through slide assembly 180, and y-axis force being applied to the parts by tooling plate 184 of slide assembly 180. This is diagrammatically illustrated in FIGS. 19 and 20 where z-axis force being applied by the platens is represented by vector VZ, the x-axis force being applied by tooling plate 42 is represented by vector VX, the y-axis force being applied by tooling plate 184 is represented by vector VY, and the resultant weld force vector is represented by the resultant vector VR. Because the magnitude and direction of vector VR is a function of the magnitude of the z-axis force, the magnitude of the x-axis force, and the magnitude of the y-axis force, changing the magnitudes of z-axis, x-axis, and y-axis forces changes magnitude of vector VR and direction of resultant vector VR in three dimensions. A controller coordinates operation of drives 41A, 41B, servo driven actuator 58, and servo driven actuator 198.

Rather than mounting one slide assembly on another slide assembly, one slide assembly may be mounted on one platen and the other slide assembly on the opposite platen, as shown schematically in FIG. 35 where slide assembly 38 is fastened to upper platen 34 and slide assembly 180 is fastened to lower platen 35. A slide assembly may also be used during movement of one part toward another to avoid potential obstructions in a path of movement in a direction parallel with the z-axis.

What is claimed is:

1. A plastic welding machine for welding plastic parts together, the plastic welding machine comprising:
    an upper platen and a lower platen which are relatively moveable on a frame toward and away from each other in a direction parallel with a main axis;
    a slide assembly comprising a base plate which is disposed against a surface of one of the upper and lower platens opposite the other of the upper and lower platens and which is fastened to the one of the upper and lower platens;

a first tooling half which is mounted on the other of the upper and lower platens and comprises a fixture in which a first plastic part can be fixtured for welding;

the slide assembly comprising a tooling plate which faces the other of the upper and lower platens and which is movable relative to the base plate in a direction lying in a plane which is transverse to the main axis;

a second tooling half which is mounted on the tooling plate for movement with the tooling plate and which comprises a fixture in which a second plastic part can be fixtured for welding to the first plastic part;

and the slide assembly comprising an actuator which is operable to move the tooling plate relative to the base plate in the direction lying in the plane which is transverse to the main axis.

2. The plastic welding machine as set forth in claim 1 in which the tooling plate is movable relative to the base plate in a direction lying in a plane which is perpendicular to the main axis.

3. The plastic welding machine as set forth in claim 2 in which the actuator comprises a ball screw which is mounted on the base plate for rotation about an axis which is parallel with the direction in which the tooling plate is movable relative to the base plate, an electric-operated servo motor which is operable to rotate the ball screw, a housing which is fastened to the tooling plate, and a nut which is non-rotatably mounted in the housing and engaged with the ball screw to move the tooling plate when the ball screw is rotated by the servo motor.

4. The plastic welding machine as set forth in claim 3 in which the servo motor is operable to rotate the ball screw in opposite directions and thereby move the tooling plate in opposite directions.

5. The plastic welding machine as set forth in claim 2 further comprising at least one actuator for moving at least one of the platens on the frame in a direction parallel with the main axis.

6. The plastic welding machine as set forth in claim 5 in which the at least one actuator is an electric-operated servo motor driven actuator.

7. The plastic welding machine as set forth in claim 2 further comprising first and second parallel rails which are mounted on the base plate in spaced apart relation to each other and which are parallel with the direction in which the tooling plate is movable relative to the base plate, and first and second sets of bearings mounted on the tooling plate, the first set of bearings traveling along, the first rail and the second set of bearings traveling along the second rail when the actuator is moving the tooling plate.

8. The plastic welding machine as set forth in claim 2 in which the fixture in which a first plastic part can be fixtured for welding is mounted on the other of the upper and lower platens through a further slide assembly comprising a base plate which is fastened to the other of the upper and lower platens, a tooling plate on which the fixture in which a first plastic part can be fixtured for welding is mounted and which is movable relative to the base plate of the further slide assembly in a direction lying in a plane which is perpendicular to the main axis and perpendicular to the direction in which the tooling plate of the slide assembly fastened to the one of the upper and lower platens is movable.

9. The plastic welding machine as set forth in claim 1 further comprising a heat source tool which is positionable between the first and second plastic parts, when the parts are fixtured in the respective fixtures and the upper and lower platens are relatively positioned to allow the heat source tool to be placed between the first and second parts, and which is operable to melt plastic of the first and second plastic parts at a weld joint location.

10. A plastic welding machine for welding plastic parts together, the plastic welding machine comprising:

an upper platen and a lower platen which are relatively moveable on a frame toward and away from each other in a direction parallel with a main axis;

a first slide assembly and a second slide assembly;

each slide assembly comprising a base plate and a tooling plate which is movable relative to the respective base plate in a respective direction lying in a plane which is perpendicular to the z-axis, the base plate of the first slide assembly being disposed against a surface of one of the upper and lower platens opposite the other of the upper and lower platens and being fastened to the one of the upper and lower platens, and the base plate of the second slide assembly being disposed against and fastened to the tooling plate of the first slide assembly;

a first tooling half which is mounted on the other of the upper and lower platens and comprises a fixture in which a first plastic part can be fixtured for welding;

a second tooling half which is mounted on the tooling plate of the second slide assembly for movement with the tooling plate of the second slide assembly relative to the base plate of the second slide assembly, the second tooling half comprising a fixture in which a second plastic part can be fixtured for welding to the first plastic part;

the first slide assembly comprising a first actuator which is operable to move the tooling plate of the first slide assembly relative to the base plate of the first slide assembly in a first direction which is perpendicular to the main axis, and the second slide assembly comprising a second actuator which is operable to move the tooling plate of the second slide assembly relative to the base plate of the second slide assembly in a second direction which is perpendicular to both the main axis and the first direction.

11. The plastic welding machine as set forth in claim 10 in which each actuator comprises a respective ball screw which is mounted on the respective base plate for rotation about an axis which is parallel with the direction in which the respective tooling plate is movable relative to the respective base plate, a respective electric-operated servo motor which is operable to rotate the respective ball screw, a respective housing which is fastened to the respective tooling plate, and a respective nut which is non-rotatably mounted in the respective housing and engaged with the respective ball screw to move the respective tooling plate when the respective ball screw is rotated by the respective servo motor.

12. The plastic welding machine as set forth in claim 11 in which the respective servo motor is operable to rotate the respective ball screw in opposite directions and thereby move the respective tooling plate in opposite directions.

13. The plastic welding machine as set forth in claim 12 in which each slide assembly further comprises first and second parallel rails which are mounted on the respective base plate in spaced apart relation to each other and which are parallel with the direction in which the respective tooling plate is movable relative to the respective base plate, and respective first and second sets of bearings mounted on the respective tooling plate, the respective first set of bearings traveling along the respective first rail and the respective second set of bearings traveling along the respective second rail when the respective actuator moves the respective tooling plate.

14. The plastic welding machine as set forth in claim 13 further comprising at least one actuator for moving at least one of the platens on the frame in a direction parallel with the main axis.

15. The plastic welding machine as set forth in claim 14 in which the at least one actuator comprises an electric-operated servo motor.

16. The plastic welding machine as set forth in claim 10 further comprising a heat source tool which is positionable between the first and second plastic parts, when the parts are fixtured in the respective fixtures and the upper and lower platens are relatively positioned to allow the heat source tool to be placed between the first and second parts, and which is operable to melt plastic of the first and second plastic parts at a weld joint location.

* * * * *